(12) United States Patent
Shrivastava et al.

(10) Patent No.: US 12,520,111 B2
(45) Date of Patent: Jan. 6, 2026

(54) METHOD AND APPARATUS FOR UE CAPABILITY AND ASSISTANCE SIGNALING FOR MBS SERVICE IN WIRELESS COMMUNICATION SYSTEM

(71) Applicant: Samsung Electronics Co., Ltd., Suwon-si (KR)

(72) Inventors: Vinay Kumar Shrivastava, Bangalore (IN); Sangkyu Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 454 days.

(21) Appl. No.: 18/146,324

(22) Filed: Dec. 23, 2022

(65) Prior Publication Data
US 2023/0209315 A1  Jun. 29, 2023

(30) Foreign Application Priority Data
Nov. 30, 2022 (IN) .............................. 202141061025

(51) Int. Cl.
*H04W 4/06* (2009.01)
*H04L 27/26* (2006.01)

(52) U.S. Cl.
CPC ......... *H04W 4/06* (2013.01); *H04L 27/26025* (2021.01)

(58) Field of Classification Search
CPC .......... H04W 4/00; H04W 4/06; H04W 4/08; H04W 76/40; H04W 47/806; H04W 49/201; H04L 27/26; H04L 27/2601; H04L 27/2602; H04L 27/26025; H04L 61/5061; H04L 65/611
See application file for complete search history.

(56) References Cited

U.S. PATENT DOCUMENTS 12,075,371 B2 *  8/2024  Sha ................... H04W 52/0216
2016/0381517 A1 * 12/2016  Kim ....................... H04W 76/10
                                                              370/331

(Continued)

FOREIGN PATENT DOCUMENTS

| WO | 2013023558 A1 | 2/2013 | |
| WO | 2021203428 A1 | 10/2021 | |
| WO | WO-2022141084 A1 * | 7/2022 | ............ H04W 52/32 |

OTHER PUBLICATIONS

Ericsson, "Open issues in Broadcast Service Continuity," R2-2108081, 3GPP TSG-RAN WG2 Meeting #115-e, Electronic meeting, Aug. 9-27, 2021, 9 pages.

(Continued)

*Primary Examiner* — Warner Wong

(57) ABSTRACT

Embodiments herein disclose methods for handling user equipment (UE) capability information and assistance information during a Multicast Broadcast Service (MBS) in a wireless communication system by a UE. The method includes receiving at least one event from a second network. Further, the method includes sending a message comprising at least one of the UE capability information and the assistance information to a first network based on the at least one received event. Further, the method includes receiving an RRC reconfiguration message comprising at least one of an addition of UE configuration, release of the UE configuration and modification of the UE configuration from the first network based on the message.

16 Claims, 15 Drawing Sheets

(56) References Cited

U.S. PATENT DOCUMENTS

| | | | |
|---|---|---|---|
| 2018/0092106 A1* | 3/2018 | Rico Alvarino | H04W 72/1263 |
| 2018/0206080 A1* | 7/2018 | Chen | H04W 76/40 |
| 2022/0132468 A1* | 4/2022 | Shrivastava | H04W 72/30 |
| 2023/0171633 A1* | 6/2023 | Babaei | H04W 4/06 370/252 |
| 2023/0276468 A1* | 8/2023 | Wu | H04W 72/30 370/312 |
| 2023/0337066 A1* | 10/2023 | Wu | H04W 36/305 |
| 2023/0353987 A1* | 11/2023 | Babaei | H04L 5/0053 |
| 2023/0354465 A1* | 11/2023 | Fujishiro | H04W 76/40 |
| 2023/0354475 A1* | 11/2023 | Fujishiro | H04W 4/06 |
| 2023/0362959 A1* | 11/2023 | Latheef | H04L 5/0044 |
| 2023/0379668 A1* | 11/2023 | Thyagarajan | H04W 4/06 |
| 2024/0098761 A1* | 3/2024 | Zhang | H04W 76/20 |
| 2024/0306166 A1* | 9/2024 | Babaei | H04W 76/40 |
| 2024/0373496 A1* | 11/2024 | Jiang | H04W 76/27 |
| 2025/0227735 A1* | 7/2025 | Babaei | H04W 72/0457 |

OTHER PUBLICATIONS

Huawei, et al., "Remaining issues of MBS Interest Indication," R2-2108201, 3GPP TSG-RAN WG2 Meeting#115-e, E-meeting, Aug. 9-27, 2021, 4 pages.

Intel Corporation, "Service continuity for delivery mode 2," R2-2108677, 3GPP TSG-RAN WG2 Meeting #115-e, Electronic meeting, Aug. 16-27, 2021, 3 pages.

Sony, "MBS Interest indication details," R2-2110346, 3GPP TSG RAN WG2 Meeting #116 electronic, Online, Nov. 1-12, 2021, 3 pages.

International Search Report and Written Opinion of the International Searching Authority dated Apr. 11, 2023, in connection with International Application No. PCT/KR2022/021186, 8 pages.

Supplementary European Search Report dated Dec. 18, 2024, in connection with European Patent Application No. 22916628.5, 17 pages.

Kyocera, "Shared processing for inter-PLMN MBS broadcast reception," R2-2212522, Revision of R2-2210427, 3GPP TSG-RAN WG2#120, Toulouse, France, Nov. 14-18, 2022, 5 pages.

Intel Corporation, "Shared processing for simultaneous MBS broadcast and Unicast Reception," R2-2210385, 3GPP TSG-RAN WG2 Meeting #119bis-e, Electronic meeting, Oct. 10-19, 2022, 4 pages.

Xiaomi, "Discussion on shared processing for MBS broadcast and unicast reception," R2-2210054, revision of R2-2207808, 3GPP TSG-RAN WG2 Meeting #119bis-e, Electronic Meeting, Oct. 10-19, 2022, 3 pages.

Catt, "Moderator''s summary for discussion [94e-23-R18-MBS]," RP-213590, 3GPP TSG RAN#94e, Electronic Meeting, Dec. 6-17, 2021, 57 pages.

Vivo, "Control of transmission area and group scheduling," R2-2010218, 3GPP TSG-RAN WG2 Meeting #112 electronic, E-Meeting, Nov. 2-13, 2020, 5 pages.

* cited by examiner

METHOD AND APPARATUS FOR UE CAPABILITY AND ASSISTANCE SIGNALING FOR MBS SERVICE IN WIRELESS COMMUNICATION SYSTEM

CROSS REFERENCE TO RELATED APPLICATIONS

This application is based on and claims priority under 35 U.S.C. § 119 to Indian Provisional Applications 202141061025, filed Dec. 27, 2021, and Indian Application No. 202141061025, filed Nov. 30, 2022, the contents of which are incorporated herein by reference.

BACKGROUND

1. Field

Embodiments disclosed herein relate to wireless communication systems (or mobile communication systems), and more particularly to methods and wireless communication systems for managing user equipment (UE) capability and assistance signaling aspects of multicast broadcast services (MBS) for new radio (NR) in a $5^{th}$ generation radio access technology (RAT).

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

Thus, it is desired to address the above mentioned disadvantages or other shortcomings or at least provide a useful alternative.

The principal object of the embodiments herein is to disclose methods and wireless communication systems for managing UE capability signaling aspects of multicast broadcast services (MBS) for a new radio (NR) in a $5^{th}$ generation radio access technology (RAT). Embodiments herein disclose how to signal the UE capability information and/or assistance information reporting to the network, when a UE is receiving broadcast and unicast simultaneously from two networks belonging to same or different operators. Based on the provided methods, the UE may be able to support the configuration and/or will support device or service performance in an optimum manner. This, results in enhancing the user experience.

SUMMARY

Accordingly, the embodiments herein provide methods for handling user equipment (UE) capability information and assistance information during a multicast broadcast service (MBS) in a wireless communication system. The method includes receiving, by a UE, at least one event from a second network. Further, the method includes sending, by the UE, a message comprising at least one of the UE capability information and the assistance information to a first network based on the at least one received event. Further, the method includes receiving, by the UE, a radio resource control (RRC) reconfiguration message comprising at least one of an addition of UE configuration, release of the UE configuration and modification of the UE configuration from the first network based on the message.

In an embodiment, sending, by the UE, the message comprising at least one of the UE capability information and the assistance information to the first network includes triggering, by the UE, to send the message comprising at least one of the UE capability information and the assistance information to the first network based on the at least one received event, and sending, by the UE, the message comprising at least one of the UE capability information and the assistance information to the first network.

In an embodiment, triggering, by the UE, to send the message comprising at least one of the UE capability information and the assistance information to the first network based on the at least one received event includes receiving, by the UE, at least one first service from the second network in one of an RRC IDLE state, an RRC_INACTIVE state, and an RRC_CONNECTED state, and at least one second service from the first network in an RRC_CONNECTED state, and triggering, by the UE, to send the message comprising at least one of the UE capability information and the assistance information to the first network.

In an embodiment, the UE receives the RRC reconfiguration message comprising at least one of the addition of the UE configuration, the release of the UE configuration and the modification of the UE configuration from the first network upon determining at least one of the modified UE capability information and the modified assistance information at the first network.

In an embodiment, the at least one event comprises at least one of a start of broadcast service reception, a stop of the broadcast service reception, and a change of the broadcast service reception in one of an idle state, an inactive state and a connected state, a start of multicast service reception in one of an inactive state and a connected state, and a change of the multicast service reception and a stop of the multicast service reception in the inactive state and the connected state.

In an embodiment, the first network is different from the second network.

In an embodiment, the first network is same as the second network. In an embodiment, the first network and the second network belongs to a same operator.

In an embodiment, at least one of the UE capability information and the assistance information comprises at least one of a frequency, an absolute radio frequency channel number (ARFCN), a frequency band, a bandwidth, a bandwidth part (BWP) configuration, a sub-carrier spacing (SCS), a temporary mobile group identity (TMGI) session identifier (ID), an MBS session ID, a common frequency resource (CFR), a number of physical resource blocks (PRBs), a number of transmission (Tx) links, a number of reception (Rx) links, a multiple-input-multiple-output (MIMO) layers utilized, a number of hybrid automatic repeat request (HARQ) processes used for the second network, a number of available HARQ processes available for the first network, a classifier for a different MBS service, an RRC state for the UE on the second network, a radio access technology (RAT) on the second network, a priority for a service, an operator name, an operator information, a discontinuous reception (DRX) configuration used for services on the second network, a preferred DRX configuration on the first network, a preferred DRX scheduling on the first network, a power consumption at the UE, a battery status at the UE, an active BWP, a bandwidth of the active BWP, a default BWP, an bandwidth of the default BWP, an initial BWP, a data rate of UE interested or receiving MBS service on one of the first network and the second network, a number of HARQ processes used for receiving UE's interested MBS services on the second network, a number of available HARQ Processes used for data reception on the first network, a band combination, discrete Fourier transform (DFT) size, a fast Fourier transform (FFT) size, a throughput, a carrier, carrier aggregation, dual connectivity, services information and a number of services.

In an embodiment, triggering to send the message comprising at least one of the UE capability information and the assistance information to the first network is performed based on at least one of a start of a service from the second network, a stop or termination of the service from the second network, and a change of configuration of the service from the second network.

In an embodiment, the service comprises at least one of an MBS broadcast service in an RRC IDLE state, an MBS broadcast service in an RRC INACTIVE state, an MBS broadcast service in an RRC CONNECTED state, an MBS multicast service in an RRC IDLE state, an MBS multicast service in an RRC INACTIVE state, an MBS multicast service in an RRC CONNECTED state, a free-to-air (FTA) service, a receive-only-mode (ROM) service and an unicast service.

In an embodiment, the message comprises at least one of an RRC signalling message, an MBS interest indication (MII) message, a UE assistance information (UAI) message, a non-access stratum (NAS) signaling message, and a medium access control (MAC) signaling message.

In an embodiment, the message carries at least one of an explicit indication, a flag and a field to be included in the message to convey the complete loss of interest in at least one service or complete stopping of at least one service from the second network.

In an embodiment, the message comprising at least one of the UE capability information and the assistance information is triggered on the first network upon meeting at least one condition. The at least one condition comprise linked with triggers, events and reporting of the second network (It implies the existing triggers for the MBS interest indication used on the second network are considered as triggers for sending capability and assistance information on the first network), linked with triggers, events and reporting for the first network (It implies the existing triggers for the MBS interest indication used on the first network are considered as triggers for sending capability and assistance information on the first network), the UE triggers a reporting to the first network, when a UE reception status for broadcast or ROM or FTA or multicast service on the second network has been changed or associated parameters have been changed, at events of capability changes on the first network, selected or accumulated reporting for different MBS service types or service groups, when RRC state on at least one of the first network changes and the second network changes, when BWP or CFR on at least one of the second network or the first network is changed or switched or activated or deactivated or made dormant, when a multiple universal subscriber identity modules (MUSIM) operation is initiated or terminated, when an MBS session is configured or activated or deactivated or released, and when there is a complete loss of interest or complete stopping of MBS services on the second network.

In an embodiment, the at least one of an addition of the UE configuration, release of the UE configuration or modification of the UE configuration comprises a bandwidth, bandwidth part (BWP), sub-carrier spacing, frequency, common frequency resource (CFR), number of physical resource blocks (PRBs), number of reception (Rx), number of transmission (Tx), number of multiple-input multiple-output (MIMO) layers, band or band combination, discrete Fourier transform (DFT) size or fast Fourier transform (FFT) size, throughput, carriers, carrier aggregation, dual connectivity, services information, number of services, DRX configuration, modulation and coding scheme (MCS) and MBS radio bearers (MRBs).

Accordingly, the embodiments herein provide methods for handling UE capability information and assistance information during an MBS in a wireless communication system. The method includes receiving, by a UE, at least one event from at least one of a secondary cell (Scell) and a non-serving cell associated with a network. Further, the method includes sending, by the UE, a message comprising at least one information to a primary cell associated with the network based on the at least one received event. Further, the method includes receiving, by the UE, a radio resource control (RRC) reconfiguration message comprising at least one configuration from the primary cell associated with the network based on the message.

In an embodiment, the at least one event comprises at least one of a start of broadcast service reception on one of the Scell and the non-serving cell, a stop of broadcast service reception on one of the Scell and the non-serving cell, a start of configuration for at least one broadcast service reception on one of the Scell and the non-serving cell, a stop of configuration for the at least one broadcast service reception on one of the Scell and the non-serving cell, a change of configuration for the at least one broadcast service reception on one of the Scell and the non-serving cell, complete loss of interest of broadcast reception on one of the Scell and the non-serving cell, and complete stop of the broadcast reception on one of the Scell and the Non-serving cell.

In an embodiment, the at least one information comprises at least one of an interested service information, a change in the interested service information and a zero interest in the interested service information.

Accordingly, the embodiments herein provide methods for handling UE capability information and assistance information during an MBS in a wireless communication system. The method includes acquiring, by a UE, at least one parameter for at least one of a UE baseband resource, the UE capability information and the assistance information. Further, the method includes estimating, by the UE, at least one of an available UE baseband resource, an available processing capability information, an operating UE baseband resource, and an operating processing capability information based on the at least one acquired parameter. Further, the method includes sending, by the UE, a message including at least one of the available UE baseband resource, the available processing capability information, the operating UE baseband resource, and the operating processing capability information to a network. Further, the method includes receiving, by the UE, a suitable configuration from the network based on the message. Further, the method includes configuring, by the UE, the suitable configuration at the UE.

Accordingly, the embodiments herein provide methods for handling UE capability information and assistance information during an MBS in a wireless communication system. The method includes receiving, by a network, a signaling message comprising at least one parameter for at least one of a UE baseband resource, the assistance information and the UE capability information from a UE. Further, the method includes estimating, by the network, at least one of an available UE baseband resource, an available processing capability information, an operating UE baseband resource, and an operating processing capability information based on the received signaling message. Further, the method includes configuring, by the network, a UE with a suitable configuration based on the estimation.

Accordingly, the embodiments herein provide methods for handling UE capability information and assistance information during an MBS in a wireless communication system. The method includes receiving, by a UE, a signal including an indication in a system information block (SIB) message for the support of a UE capability and assistance information reporting (e.g., SIB1 can carry a field that indicates the network supports the UE capability information and/or UE assistance information reporting for the shared processing for the broadcast and unicast by the UE. This indication in the SIB1 and reporting by the UE can be irrespective of the presence or absence of SIB21 on the first network or the primary cell). Further, the method includes utilizing, by the UE, the UE capability and assistance information reporting.

Accordingly, the embodiments herein provide a UE. The UE includes an MBS controller coupled with a processor and a memory. The MBS controller is configured to receive at least one event from a second network. Further, the MBS controller is configured to send a message comprising at least one of the UE capability information and the assistance information to a first network based on the at least one received event. Further, the MBS controller is configured to receive an RRC reconfiguration message comprising at least one of an addition of the UE configuration, a release of the UE configuration and the modification of the UE configuration from the first network based on the message.

Accordingly, the embodiments herein provide a UE. The UE includes an MBS controller coupled with a processor and a memory. The MBS controller is configured to receive at least one event from at least one of a secondary cell (Scell) and a non-serving cell associated with a network. Further, the MBS controller is configured to send a message comprising at least one information to a primary cell (Pcell) associated with the network based on the at least one received event. Further, the MBS controller is configured to receive an RRC reconfiguration message comprising at least one configuration from the primary cell associated with the network based on the message.

Accordingly, the embodiments herein provide a UE. The UE includes an MBS controller coupled with a processor and a memory. The MBS controller is configured to acquire at least one parameter for at least one of a UE baseband resource, the UE capability information and the assistance information. Further, the MBS controller is configured to estimate at least one of an available UE baseband resource, an available processing capability information, an operating UE baseband resource, and an operating processing capability information based on the at least one acquired parameter. Further, the MBS controller is configured to send a message including at least one of the available UE baseband resource, the available processing capability information, the operating UE baseband resource, and the operating processing capability information to a network. Further, the MBS controller is configured to receive a suitable configuration from the network based on the message. Further, the MBS controller is configured to configure the suitable configuration at the UE.

Accordingly, the embodiments herein provide a UE. The UE includes an MBS controller coupled with a processor and a memory. The MBS controller is configured to receive a signal including an indication of sharedProcessingInfoReporting in a system information block (SIB) message for a support of a UE capability and assistance information reporting from a first network. Further, the MBS controller is configured to utilize the UE capability and assistance information reporting.

Accordingly, the embodiments herein provide a network. The network includes an MBS controller coupled with a processor and a memory. The MBS controller is configured to receive a signaling message comprising at least one parameter for at least one of a UE baseband resource, the assistance information and the UE capability information from a UE. Further, the MBS controller is configured to estimate at least one of an available UE baseband resource, an available processing capability information, an operating UE baseband resource, and an operating processing capability information based on the received signaling message. Further, the MBS controller is configured to configure a UE with a suitable configuration based on the estimation.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

According to various embodiments of the disclosure, signaling procedures regarding MBS service can be efficiently enhanced.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The embodiments disclosed herein are illustrated in the accompanying drawings, throughout which like reference letters indicate corresponding parts in the various figures. The embodiments herein will be better understood from the following description with reference to the drawings, in which.

DETAILED DESCRIPTION

Figure 1:
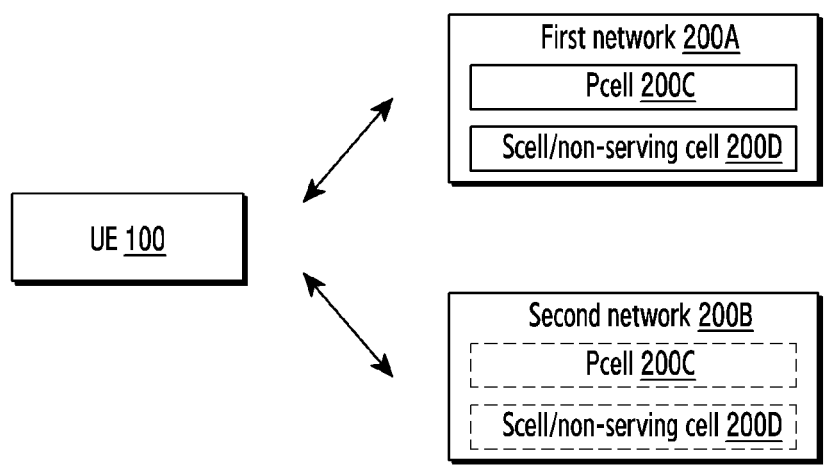
FIG. 1 illustrates a wireless communication system for handling UE capability information and assistance information during an (MBS according to the embodiments as disclosed herein.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

In general, a UE can be associated with one or more cells, carriers, frequencies, bandwidth parts (BWPs), cell groups (e.g., master cell group (MCG) or secondary cell group (SCG)), tracking areas (TAs), non-public networks (NPNs), public land mobile networks (PLMNs), networks, subscriber identity modules (SIMs) and mobile network operators (MNOs) or simply, termed as operators. That is, generically stating, it is possible for a UE to receive a service (e.g., unicast service, multicast service, broadcast service or the like) on two or more different networks/operators.

For simplicity, at most two networks/operators are considered herein, without any loss of generality. Further, there may or may not be coordination across these two networks/operators or there is no uplink signaling with regards to broadcast reception (e.g., broadcast reception in radio resource control (RRC)_IDLE or RRC_INACTIVE states) and resultantly, the concerned network may not be aware about the UE receiving such services like broadcast service.

As an example, consider the UE is receiving unicast service(s) on a wireless network (i.e., first network (NW A or operator A) and is receiving broadcast service(s) on a wireless network (i.e., second network (NW B or operator B). In this scenario, the second network may not be aware about the UE receiving the broadcast service as this is either not signalled to the second network (e.g., the UE may be in RRC_IDLE or RRC_INACTIVE state) or even if it is signalled to the second network, the second network may not have any coordination with the first network. As the first network is not aware about the UE receiving the broadcast service(s) on the second network and resultantly, some of the baseband resource (processing) capability of the UE are used up in supporting these service(s), the first network may have wrong assessment/information of UE capabilities and wrongly configure the UE with the configurations which are not suitable e.g., the first network may configure the UE with a full-fledged configuration (e.g., a carrier aggregation configuration with maximum number of component carriers or serving cells or a dual connectivity) assuming full baseband resource capability and resultantly, the UE may not be able to support the configuration and/or will support not in optimum manner in terms of device or service performance and/or satisfactory user experience.

The embodiments herein achieve methods for handling UE capability information and assistance information during an MBS in a wireless communication system. The method includes receiving, by a UE, at least one event from a second network. Further, the method includes sending, by the UE, a message comprising at least one of the UE capability information and the assistance information (also termed as sharing processing information reporting in the patent disclosure and is used interchangeably) to a first network based on the at least one received event. Further, the method includes receiving, by the UE, a radio resource control (RRC) reconfiguration message comprising at least one of an addition of UE configuration, release of the UE configuration and modification of the UE configuration from the first network based on the message.

The methods and systems can be used for managing UE capability signaling aspects of multicast broadcast services (MBS) for new radio (NR) radio access technology (RAT). Embodiments herein disclose how to signal a UE capability information and/or assistance information reporting to a network, when a UE is receiving broadcast and unicast simultaneously from two networks belonging to same or different operators.

Based on the provided methods, the UE may be able to support the configuration and/or will support device or service performance in an optimum manner. This, results in enhancing the user experience.

Referring now to the drawings, and more particularly to FIGS. 1 through 13, where similar reference characters denote corresponding features consistently throughout the figures, there are shown at least one embodiment.

FIG. 1 illustrates a wireless communication system (1000) for handling the UE capability information and assistance information during an MBS according to the embodiments as disclosed herein. The wireless communication system (1000) can be, for example, but not limited to a fourth generation (4G) wireless network, a fifth generation (5G) wireless network or New Radio (NR) wireless network, an open radio access technology (ORAN) or the like.

The wireless communication system (1000) includes a UE (100), a first wireless network (200A), and a second wireless network (200B). In an example, the first wireless network (200A) includes a Pcell (200C) and a Scell/Non-serving cell (200D). In another example, the second wireless network (200B) includes the Pcell (200C) and the Scell/Non-serving cell (200D). The UE (100) can be, for example, but not limited to a laptop, a desktop computer, a notebook, a relay device, a vehicle to everything (V2X) device, a smartphone, a tablet, an internet of things (IoT) device, an immersive device, a virtual reality device, a foldable device, a Television with communication facility, a connected car or the like. The first wireless network (200A) and the second wireless network (200B) may also include or be referred to by those skilled in the art as a base station, a base transceiver station, a radio base station, an access point, a radio transceiver, an eNB, a gNodeB (gNB), a radio cell or the like.

In an embodiment, the first network (200A) is different from the second network (200B). In an embodiment, the first network (200A) is same as the second network (200B). In an embodiment, the first network (200A) and the second network (200B) belongs to a same operator. In an embodiment, the first network (200A) and the second network (200B) are at least one of the primary cell (200C), the secondary cell (200D) or the non-serving cell of the same network.

The MBS services (e.g., NR MBS services or the like) include:

1. Multicast services, for which the network transfers common user data that is intended to be received only by a specific group of UEs (100) which have joined the concerned multicast group; and
2. Broadcast services, for which the network transfers common user data that can be received by all UEs (100) interested to receive the service.

The network (200A or 200B) may provide MBS services in a limited part of the network and coverage area of MBS services can be one cell or larger. A 5G Core Network (CN) (not shown) can deliver MBS user data to the radio access network (RAN) using following delivery methods:

1. Individual delivery: for each individual UE (100) receiving the MBS service, the CN delivers separate copies of the MBS user data packets to the RAN (i.e., via per-UE PDU sessions, alike in case of unicast delivery); and
2. Shared delivery: The CN delivers a single copy of MBS user data to the RAN i.e., via a shared PDU session/tunnel), with RAN handling delivery to one or multiple UEs.

Beside MBS services, a UE (100) may be engaged in unicast services also and in some scenarios, the UE (100) can also avail unicast and MBS services from two networks belonging to same or different operators.

Dual/Multiple Network Scenarios.

In an embodiment, the UE (100) receives at least one service or service set Y on the second network (200B) in one of an RRC_IDLE state, an RRC_INACTIVE state, and an RRC_CONNECTED state, and at least one service or service set X on the first network (200A) in RRC_CONNECTED state, then the UE (100) triggers and sends a signaling message to the first network (200A) (and/or the second network (200B)) informing the UE (100) baseband resource and/or processing capability information used to supporting service or service set Y on the second network (200B) (and/or informing the UE (100) baseband resource and/or processing capability information available to supporting service or service set Y on the first network (200A)). In an embodiment, the UE baseband resource and/or processing capability information is termed as shared processing information reporting in the patent disclosure.

In an embodiment, the UE baseband resource and/or processing capability information may include at least one of Bandwidth, BWP, sub-carrier spacing, frequency, common frequency resource (CFR), number of physical resource blocks (PRBs), number of Rx, number of Tx, number of multiple-input multiple-output (MIMO) layers, band or band combination, discrete Fourier transform (DFT) size or fast Fourier transform (FFT) size, throughput, carriers, carrier aggregation, dual connectivity, services information or number of services, DRX configuration, scheduling configuration information and so on.

In an embodiment, the triggers for sending of the signaling message to the first network (200A) may include:

1. Start of a service or service set Y on the second network (200B);
2. Stop or termination of a service or service set Y on the second network (200B);
3. Change of configuration of a service or service set Y on the second network (200B); and
4. In an embodiment, the service or service set Y on the second network (200B) can comprise one or more of at least one of the following service types:
    1) MBS broadcast service in RRC_IDLE state,
    2) MBS broadcast service in RRC_INACTIVE state,
    3) MBS broadcast service in RRC_CONNECTED state,
    4) MBS multicast service in RRC_IDLE state,
    5) MBS multicast service in RRC_IDLE state,
    6) MBS multicast service in RRC_CONNECTED state,
    7) Free-To-Air (FTA) service,
    8) Receive-Only-Mode (ROM) service, and
    9) Unicast service.

The service or service set X on the first network (200A) can comprise of unicast, multicast and broadcast service(s) in the RRC_CONNECTED state.

In an embodiment, the signaling message for the UE capability information and/or assistance information is an RRC signaling message comprising at least one of MBS interest indication (MII) message and UE assistance information (UAI) message. Further, UE capability information and/or assistance information can also be a part or sub-part of at least one of MBS interest indication (MII) message and UE assistance information (UAI) message.

In an embodiment, the signaling message for the UE capability information and/or assistance information comprises of one or more instances of at least one of the following:

1) Frequencies or absolute radio frequency channel number (ARFCNs),
2) Frequency band,
3) Bandwidth,
4) Bandwidth part (BWP) configuration,
5) Sub-carrier Spacing (SCS),
6) TMGI or MBS session ID,
7) common frequency resource (CFR),
8) Number of physical resource blocks (PRBs),
9) Number of Tx and/or Rx links/paths,
10) MIMO layers utilized,
11) Number of hybrid automatic repeat request (HARQ) processes used for the second network (200B) and/or number of available HARQ processes available for the first network (200A),
12) Classifier for different MBS services (e.g., broadcast, FTA, ROM, multicast),
13) RRC state for the UE (100) on the second network (200B),
14) Radio access technology (RAT) on the second network (200B) (e.g., LTE, NR),
15) Priorities for service(s),
16) Operator name or information,
17) DRX configuration or scheduling used for services on the second network (200B) or preferred DRX configuration or scheduling on the first network (200A),
18) Power consumption or battery status,
19) Active BWP and bandwidth of the Active BWP,
20) Default BWP and bandwidth of the Default BWP,
21) Data rate of UE's interested or receiving MBS services on the first network (200A) and/or the second network (200B), 22) Number of HARQ Processes used for receiving UE's interested MBS services on the second network (200B), and
23) Number of available HARQ Processes used for data reception on the first network (200A).

In an embodiment, zero instance of the above mentioned parameters are included in the signaling message for UE capability information and/or assistance information. That is, the message is empty. In another embodiment, the signaling message carries an explicit indication or a flag or field (e.g., Mbs-ZeroLossCapability) that represents the message is not carrying any parameter and is triggered due to complete loss of interest in service(s) or complete stopping of service(s) on the second network (200B).

In an embodiment, the network support for the UE capability information and/or assistance information reporting (or shared processing information reporting) is broadcasted on a system information block (SIB) e.g., in a field or a parameter or a bit or bitmap indicating "sharedProcessingInfoReporting" in the SIB1. Further this indication and the reporting of the shared processing information reporting (e.g., in an MBS interest indication message) is irrespective of the presence or absence of the SIB21 on the serving cell of the first network.

In an embodiment, the UE (100) reports only shared processing information in the MBS interest indication when the serving cell of the first network (200A) only broadcasts SIB1 with "sharedProcessingInfoReporting" field, but SIB21 is not present.

In an embodiment, the UE (100) reports both shared processing information and the interested MBS services information in the MBS interest indication when the serving cell of the first network (200A) broadcasts SIB1 with "sharedProcessingInfoReporting" field, and SIB21 is also present.

In an embodiment, the UE (100) reports only the interested MBS services information in the MBS interest indication when the serving cell of the first network broadcasts SIB1 with no "sharedProcessingInfoReporting" field, and SIB21 is present.

In an embodiment, the UE (100) does not transmit the MBS interest indication message when the serving cell of the first network broadcasts SIB1 with no "sharedProcessingInfoReporting" field, and SIB21 is absent.

In an embodiment, a message structure for SIB1 including a field for "sharedProcessingInfoReporting" is provided as below table 1.

In an embodiment, the initiation of MBS interest indication procedure is described as follows:
1> if SIB21 is provided by the PCell; or
1> if "sharedProcessingInfoReporting" is received in SIB1 from the PCell:
2> ensure having a valid version of SIB21 for the PCell;
2> if the UE did not transmit MBS interest indication since last entering RRC_CONNECTED state; or
2> if since the last time the UE transmitted an MBS interest indication, the UE connected to a PCell not providing SIB21 nor including "sharedProcessingInfoReporting" in SIB1:
3> if the set of MBS broadcast frequencies of interest, determined in accordance with 5.9.4.3, is not empty:
4> set the contents of MBS interest indication according to 5.9.4.5 and initiate transmission of the MBSInterestIndication message;
2> else:
3> if the set of MBS broadcast frequencies of interest, determined in accordance with 5.9.4.3, is different from mbs-FreqList included in the last transmission of the MBS interest indication; or
3> if at least one of the parameter of shared Processing Information Report (e.g., sub-carrier spacing, bandwidth, frequency etc.), determined in accordance with 5.9.4.3, has changed since the last transmission of the MBS interest indication; or
3> if the prioritisation of reception of all indicated MBS broadcast frequencies compared to reception of any of the established unicast bearers and multicast MRBs has changed since the last transmission of the MBS interest indication:
4> set the contents of MBS interest indication according to 5.9.4.5 and initiate transmission of the MBSInterestIndication message;
Please note that the UE (100) may send MBS interest indication even when it is able to receive the MBS services it is interested in i.e., to avoid that the network allocates a configuration inhibiting MBS broadcast reception.
3> else if SIB20 is provided for the PCell or for the SCell:
4> if since the last time the UE transmitted the MBS interest indication, the UE connected to a PCell not providing SIB20 and the UE was not provided with SIB20 for an SCell; or

TABLE 1

```
SIB1 ::= SEQUENCE {
   cellSelectionInfo          SEQUENCE {
      q-RxLevMin                 Q-RxLevMin,
      q-RxLevMinOffset              INTEGER (1..8)        OPTIONAL, -- Need S
      q-RxLevMinSUL              Q-RxLevMin            OPTIONAL, -- Need R
      q-QualMin                  Q-QualMin             OPTIONAL, -- Need S
      q-QualMinOffset               INTEGER (1..8)       OPTIONAL -- Need S
   }                             OPTIONAL, -- Cond Standalone
   cellAccessRelatedInfo         CellAccessRelatedInfo,
   ......
}
......
SIB1-v1800-IEs ::=          SEQUENCE {
   sharedProcessingInfoReporting    -r18           ENUMERATED {true}  OPTIONAL, -- Need R
```

4> if the set of MBS broadcast services of interest determined in accordance with 5.9.4.4 is different from mbs-ServiceList included in the last transmission of the MBS interest indication:

5> set the contents of MBS interest indication according to 5.9.4.5 and initiate the transmission of MBSInterestIndication message.

5.9.4.3 MBS Frequencies of Interest Determination

The UE (100) shall:

1> consider a frequency to be part of the MBS frequencies of interest if the following conditions are met:

2> at least one MBS session the UE is receiving or interested to receive via a broadcast MRB is ongoing or about to start; and Please note that the UE (100) may determine whether the session is ongoing from the start and stop time indicated in the User Service Description (USD), see TS 38.300 or TS 23.247.

2> for at least one of these MBS sessions, SIB21 acquired from the PCell includes mapping between the concerned frequency and one or more MBS FSAIs indicated in the USD for this session, or for at least one of these MBS sessions, the concerned frequency is not included in SIB21 but is indicated in the USD for this session, or the SIB1 includes a field "sharedProcessingInfoReporting"; and please note that the UE (100) considers a frequency to be part of the MBS frequencies of interest even though NG-RAN may (temporarily) not employ a broadcast MRB for the concerned session, i.e., the UE (100) does not verify if the session is indicated on MCCH.

2> the supportedBandCombinationList the UE included in UE-NR-Capability contains at least one band combination including the concerned MBS frequency.

please note that the When evaluating which frequencies the UE (100) is capable of receiving, the UE (100) does not take into account whether they are currently configured as serving frequencies.

5.9.4.5 Setting of the Contents of MBS Interest Indication

The UE (100) shall set the contents of the MBS interest indication as follows:

1> if the set of MBS frequencies of interest, determined in accordance with 5.9.4.3, is not empty:

2> include mbs-FreqList and set it to include the MBS frequencies of interest sorted by decreasing order of interest, using the absoluteFrequencySSB for serving frequency, if applicable, and the ARFCN-ValueNR(s) as included in SIB21 or in USD (for neighbouring frequencies);

2> include mbs-Priority if the UE priorities reception of all indicated MBS frequencies above reception of any of the unicast bearers and multicast MRBs;

please note that if the UE (100) priorities MBS broadcast reception and unicast/multicast data cannot be supported because of congestion on the MBS carrier(s), NG-RAN may for example initiate release of unicast bearers/multicast MRBs.

2> if SIB20 is provided for the PCell or for the SCell:

3> include mbs-ServiceList and set it to indicate the set of MBS services of interest sorted by decreasing order of interest determined in accordance with 5.9.4.4.

1> if the UE is receiving MBS service(s) (e.g., an MBS broadcast service on a secondary cell or on a non-serving cell or on another network) and UE is indicated with sharedProcessingInfoReporting in SIB1:

2> if the supportedBandCombination the UE included in UE-Capability contains at least one band combination including the MBS frequency:

3> include one or more parameters for shared Processing Information Report (e.g., Frequency, SubcarrierSpacing and Bandwidth);

In an embodiment, the signaling message for the UE capability information and/or assistance information is triggered on the first network (200A) upon meeting at least one of the conditions as listed:

1) Linked with triggers and reporting of the first network (200A)/operator (e.g., related MII or UAI). It implies the existing triggers for the MBS interest indication used on the first network (200A) are considered as triggers for sending capability and assistance information on the first network (200A).

2) Linked with triggers/events for second network (200B)/operator (e.g., related MII or UAI) or MBS service changes. It implies the existing triggers for the MBS interest indication used on the second network are considered as triggers for sending capability and assistance information on the first network.

3) When UE's reception status for broadcast/ROM/FTA/Multicast service(s) on the second network (200B) has been changed (e.g., start/stop) or associated parameters have been changed, the UE (100) may trigger the reporting to the first network (200A). For example, the UE (100) may switch to non-MBS cell from the MBS cell and is not able to receive the MBS services, 4) At events of capability changes on the first network (200A)/operator, 5) Selected or accumulated reporting for different MBS service types or service groups, 6) When the RRC state on at least one of the first network (200A) and the second network (200B) changes. For example, when the RRC state on the first network (200A) changes to an RRC_CONNECTED from an RRC_IDLE/RRC_INACTIVE, 7) When the BWP or the CFR on at least one of the first network (200A) and the second network (200B) is changed or switched or activated or deactivated or made dormant, 8) When multiple universal subscriber identity modules (MUSIM) operation is initiated or terminated, 9) When the MBS session is configured (started) or activated or deactivated or released (stopped), and 10) When there is a complete loss of interest or complete stopping of MBS services on the second network (200B).

Figure 4:
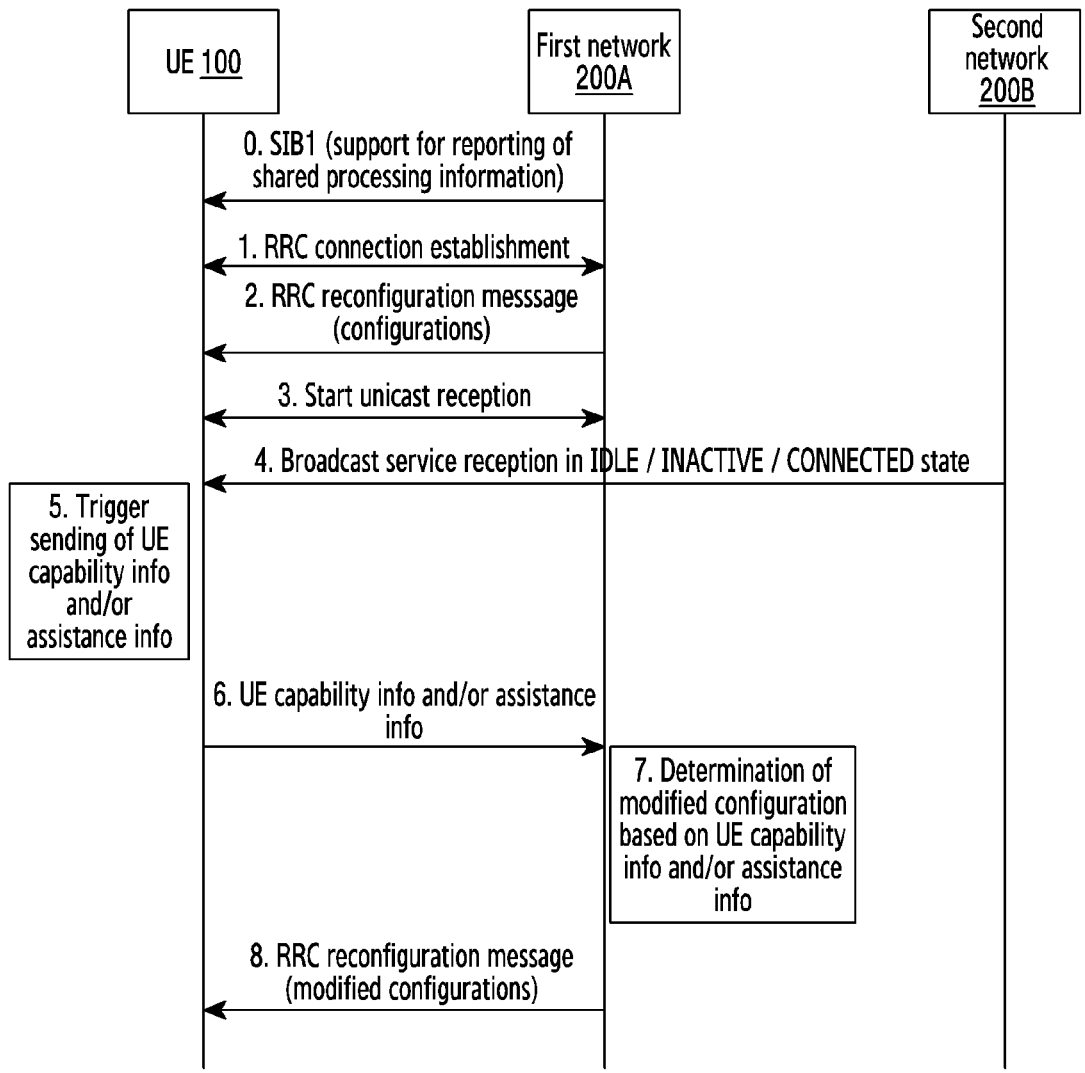
FIG. 4 illustrates a process of simultaneous unicast and MBS broadcast service reception according to embodiments as disclosed herein.

In an example, as depicted in FIG. 4 (which depicts the process of simultaneous unicast and MBS broadcast service reception), the first network (200A) broadcasts, in the SIB message, an indication for the support of reporting for shared processing information. The UE (100) establishes RRC connection on the first network (200A) and starts receiving the unicast services. While the UE (100) is engaged with the unicast reception on the first network (200A), the UE (100) may initiate for reception of broadcast service on the second network (200B). The UE (100) may be in one of RRC_IDLE or RRC_INACTIVE or RRC_CONNECTED state on the second network (200B). In RRC_IDLE or the RRC_INACTIVE, the second network (200B) is not aware about the UE (100) receiving broadcast. Even when the UE (100) is in the RRC_CONNECTED state, there may not be any coordination between the first network (200A) and the second network (200B) to exchange information on broadcast reception.

As the UE (100) may perform operations on the second network (200B) which may include, but not limited to, start receiving one or more broadcast service or stop receiving one or more broadcast or complete stop of all broadcast services or certain parameters of broadcast service reception may change (e.g., bandwidth, bandwidth part (BWP), sub-carrier spacing (SCS), frequency, common frequency resource (CFR), number of physical resource blocks, number of reception paths/links/circuits (Rx), number of transmission path/links/circuits (Tx), multiple input multiple output (MIMO) layers used) or cell selection/reselection/handover to MBS cell/non-MBS cell enables/disables MBS reception or RRC state change), the resultant baseband resource and/or processing requirement to receive broadcast services for the UE (100) is changed.

Accordingly, the UE (100) determines the available baseband resource and/or processing capability towards the unicast reception on the first network (200A). The UE (100) builds the signaling message for the UE capability information and/or assistance information (e.g., in an MBS interest indication message) and reports to the first network (200A).

Figure 5:
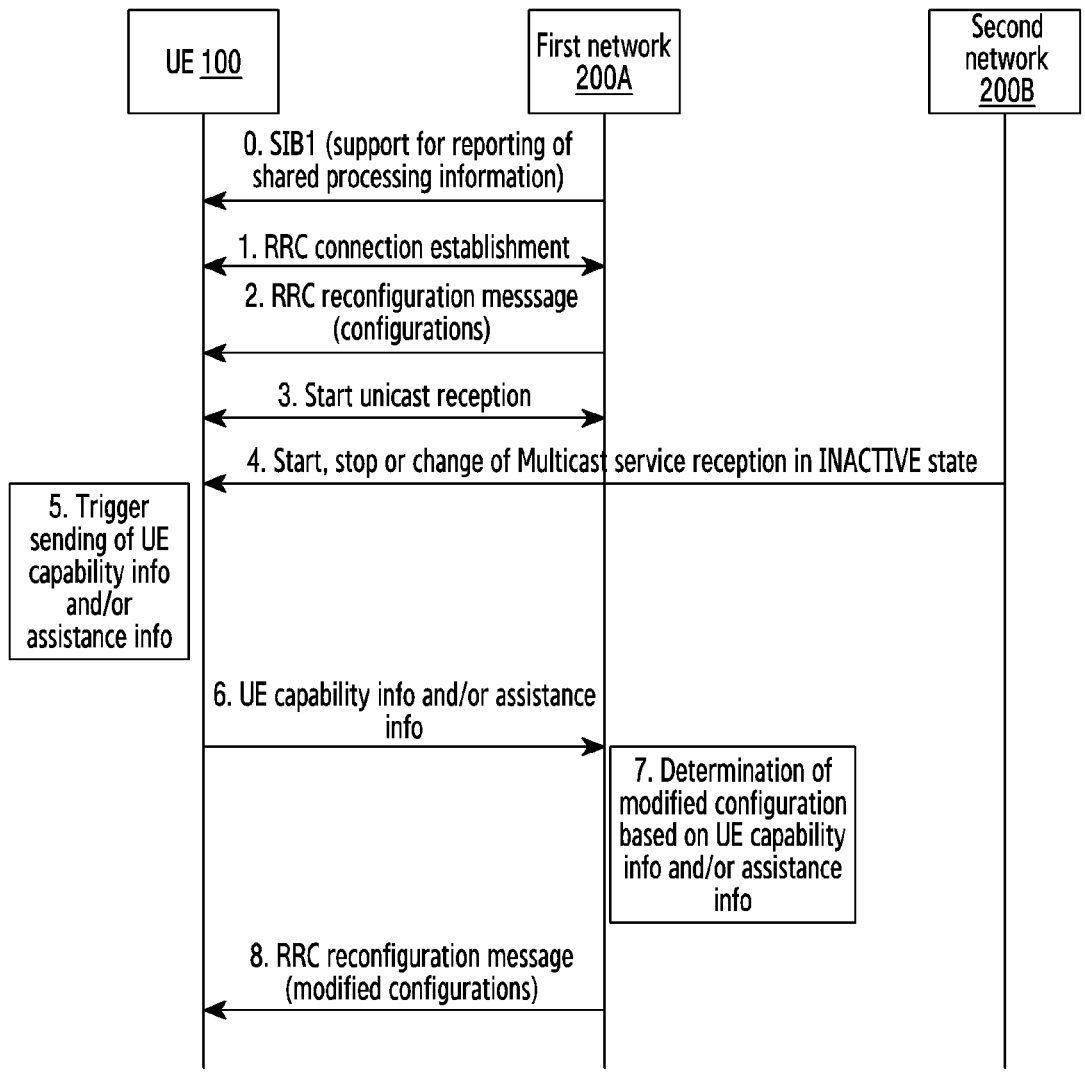
FIG. 5 illustrates a process of simultaneous unicast and MBS multicast service reception according to embodiments as disclosed herein.

In another example, as depicted in FIG. 5 (which depicts the process of simultaneous unicast and MBS multicast service reception), the first network (200A) broadcasts in a SIB message an indication for the support of reporting for shared processing information. The UE (100) establishes the RRC connection on the first network (200A) and starts receiving the unicast services. While the UE (100) is engaged with the unicast reception on the first network (200A), the UE (100) may initiate for reception of multicast service on the second network (200B). The UE (100) may be in an RRC_INACTIVE state on the second network (200B).

As the UE (100) may perform operations on the second network (200B), which may include, but not limited to, start receiving one or more multicast service or stop receiving one or more multicast services or complete stop of all multicast services or certain parameters of multicast service reception may change (e.g., bandwidth, BWP, sub-carrier spacing, frequency, CFR, number of physical resource blocks, number of Rx, number of Tx, MIMO layers used) or cell selection/reselection/handover to MBS cell/non-MBS cell enables/disables MBS reception or RRC state change). Further, for multicast services, multicast sessions can be activated and/or deactivated and/or released from the second network (200B). The resultant baseband resource and/or processing requirement to receive multicast services for the UE (100) is changed Accordingly, the UE (100) determines the available baseband resource and/or processing capability towards unicast reception on the first network (200A). The UE (100) builds the signaling message for UE capability information and/or assistance information (e.g., in an MBS interest indication message) and reports to the first network (200A).

Figure 6:
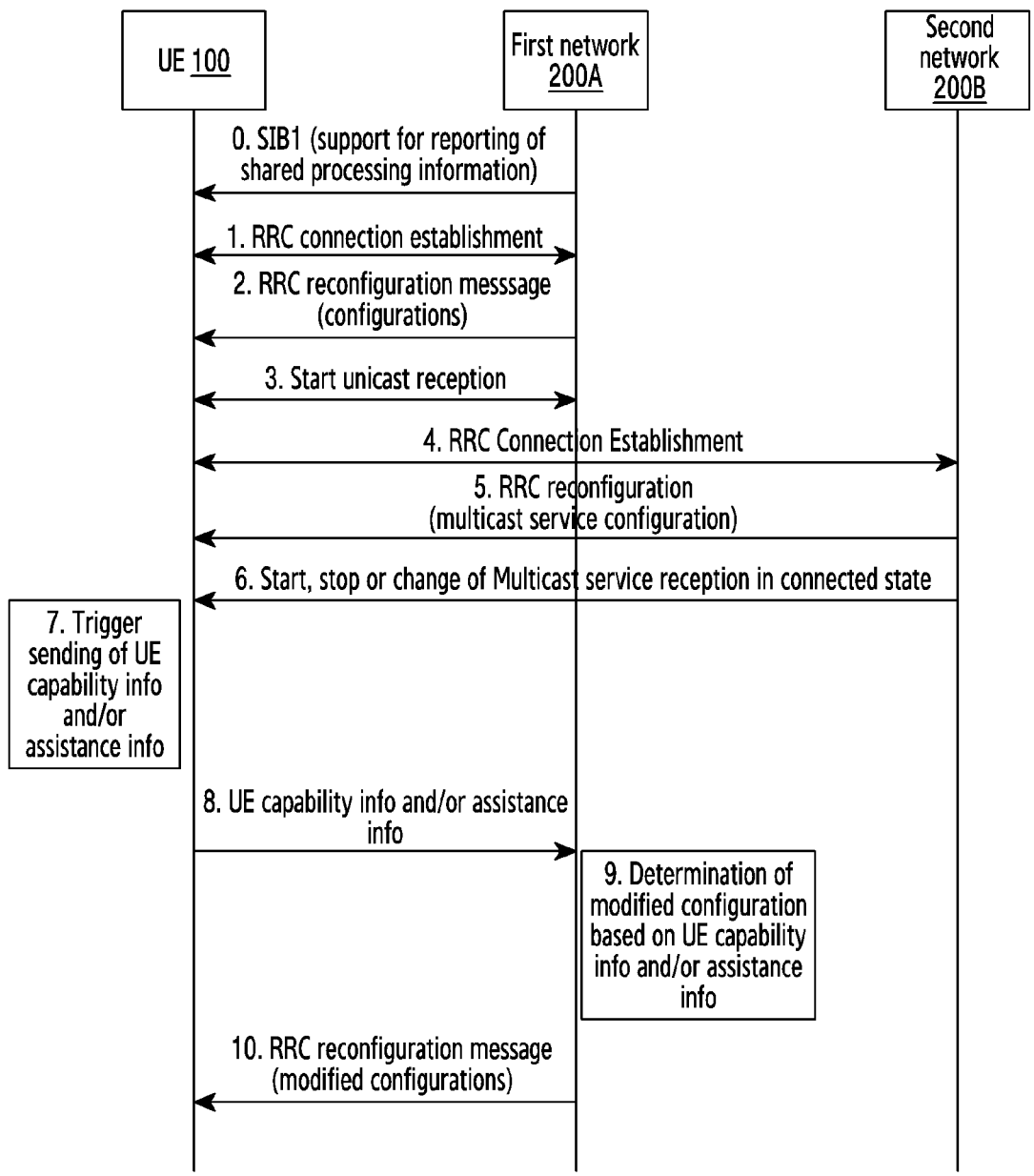
FIG. 6 illustrates a process of simultaneous unicast and MBS multicast service reception according to embodiments as disclosed herein.

In another example, as depicted in FIG. 6 (which depicts the process of simultaneous unicast and MBS multicast service reception), the first network (200A) broadcasts, in the SIB message, the indication for the support of reporting for shared processing information. The UE (100) establishes the RRC connection on the first network (200A) and starts receiving the unicast services. While the UE (100) is engaged with the unicast reception on the first network (200A), the UE (100) may initiate for reception of multicast service on second network (200B). The UE (100) may be in an RRC_CONNECTED state on the second network (200B). However, there may be no coordination between the first network (200A) and the second network (200B) for exchanging information about multicast service reception.

As the UE (100) may perform operations on the second network (200B) which may include, but not limited to, start receiving one or more multicast service or stop receiving one or more multicast services or complete stop of all multicast services or certain parameters of multicast service reception may change (e.g., bandwidth, BWP, sub-carrier spacing, frequency, CFR, number of physical resource blocks, number of Rx, number of Tx, MIMO layers used) or cell selection/reselection/handover to MBS cell/non-MBS cell enables/disables MBS reception or RRC state change). Further, for multicast services, there can be deactivation and/or activation and/or release of multicast session from the second network (200B). The resultant baseband resource and/or processing requirement to receive multicast services for the UE (100) is changed Accordingly, the UE (100) determines the available baseband resource and/or processing capability towards unicast reception on the first network (200A). The UE (100) builds the signaling message for the UE capability information and/or assistance information (e.g., in an MBS interest indication message) and reports to the first network (200A).

First Alternative: MBS-Capability-Info-r18 is provided in the MBS interest indication message, as described in table 2 below.

TABLE 2

MBS-InterestIndication-r17 ::= SEQUENCE {
   mbs-FreqList-r17 CarrierFreqListMBS-r17 OPTIONAL,
   mbs-Priority-r17 ENUMERATED {true}. OPTIONAL,
   mbs-ServiceList-r17 OPTIONAL
}
CarrierFreqListMBS-r17 ::= SEQUENCE (SIZE (1..maxFreqMBS-r17)) OF ARFCN-ValueNR
MBS-ServiceList-r17 ::= SEQUENCE (SIZE (1..maxNrofMBS-ServiceListPerUE-r17)) OF MBS-ServiceInfo-r17
MBS-ServiceInfo-r17 ::= SEQUENCE {
   tmgi-r17
}
MBMSInterestIndication-v18-IEs ::= SEQUENCE {
   mbs-Capability-InfoList-r18 SEQUENCE (SIZE(1..maxMBS-ServiceListPerUE)) OF MBS-Capability-Info-r18. OPTIONAL,
   nonCriticalExtension. SEQUENCE { } OPTIONAL
}
MBS-Capability-Info-r18 ::= SEQUENCE {
   mbs-Freq-r18                     OPTIONAL,
   mbs-SubcarrierSpacing-r18     OPTIONAL,
   mbs-BWP-Index-r18            OPTIONAL,
   mbs-Num-Rx                    OPTIONAL,
   mbs-Num-Tx                    OPTIONAL
   ....
}

Second Alternative: An empty MBS interest indication message is sent when there is a complete loss of interest in MBS services, as described in table 3.

TABLE 3

MBMSInterestIndication-v18-IEs ::= {
Empty message
}
Third Alternative: A field "Mbs-ZeroLossCapability" is included in MBS Interest Indication message when there is when there is a complete loss of interest in MBS services
MBMSInterestIndication-v18-IEs ::=SEQUENCE {
   mbs-Capability-InfoList-r18 SEQUENCE (SIZE(1..maxMBS-ServiceListPerUE)) OF MBS-Capability-Info-r18 OPTIONAL,
   Mbs-ZeroLossCapability ENUMERATED {true} OPTIONAL
   nonCriticalExtension SEQUENCE { } OPTIONAL
}
MBS-Capability-Info-r18 ::= SEQUENCE {
   mbs-Freq-r18 OPTIONAL,
   mbs-SubcarrierSpacing-r18                OPTIONAL, TABLE 3-continued

| | |
|---|---|
| mbs-BWP-Index-r18 | OPTIONAL, |
| mbs-Num-Rx | OPTIONAL, |
| mbs-Num-Tx | OPTIONAL |
| ....... | |
| } | |

Fourth Alternative: MBS-Capability-Info-r18 is provided in the UE assistance information message, as described in table 4.

TABLE 4

| | |
|---|---|
| UEAssistanceInformation-v18-IEs ::= | SEQUENCE { |
|    mbs-UECapability-AssistanceInfo-v18 | |
|    MBS-UECapabilityAssistanceInfoList-v18 | |
|    OPTIONAL, | |
|    nonCriticalExtension | SEQUENCE { } OPTIONAL |
| } | |
| MBS-UECapabilityAssistanceInfoList | -r18 SEQUENCE |
| (SIZE(1..maxMBS-ServiceListPerUE)) | OF MBS- |
| UECapabilityAssistanceInfo-r18 | |
| } | |
| MBS-UECapabilityAssistanceInfo-r18 ::= SEQUENCE { | |
|    mbs-Freq-r18 | OPTIONAL, |
|    mbs-SubcarrierSpacing-r18 | OPTIONAL, |
|    mbs-BWP-Index-r18 | OPTIONAL, |
|    mbs-Num-Rx | OPTIONAL, |
|    mbs-Num-Tx | OPTIONAL |
| ....... | |
| } | |

Fifth Alternative: an empty UE assistance information message is sent when there is a complete loss of interest in MBS services, as described in table 5.

TABLE 5

| |
|---|
| UEAssistanceInformation-v18-IEs::= { |
|    Empty message |
| } |

Sixth Alternative: a field "Mbs-ZeroLossCapability" is included in UE Assistance Information message when there is when there is a complete loss of interest in MBS services, as described in table 6.

TABLE 6

| | |
|---|---|
| UEAssistanceInformation-v18-IEs ::= | SEQUENCE { |
|    mbs-UECapability-AssistanceInfo-v18 | |
|    MBS-UECapabilityAssistanceInfoList-v18 | |
|    OPTIONAL, | |
|    Mbs-ZeroLossCapability ENUMERATED {true} OPTIONAL | |
|    nonCriticalExtension SEQUENCE { } OPTIONAL | |
| } | |
| MBS-UECapabilityAssistanceInfoList | -r18 SEQUENCE |
| (SIZE(1..maxMBS-ServiceListPerUE)) | OF MBS- |
| UECapabilityAssistanceInfo-r18 | |
| } | |
| MBS-UECapabilityAssistanceInfo-r18 ::= SEQUENCE { | |
|    mbs-Freq-r18 | OPTIONAL, |
|    mbs-SubcarrierSpacing-r18 | OPTIONAL, |
|    mbs-BWP-Index-r18 | OPTIONAL, |
|    mbs-Num-Rx | OPTIONAL, |
|    mbs-Num-Tx | OPTIONAL |
| ....... | |
| } | |

In an embodiment, the UE capability information and/or assistance information can be conveyed by the UE (100) through a non-access stratum (NAS) signaling, an RRC signaling message or a medium access Control (MAC) signaling message. For example, the RRC signaling message can be an MBS interest indication message or the UE assistance information message or a new RRC signaling message. In an embodiment, the network (e.g., first network (200A)) configures the UE (100) for the signaling through the "otherConfig" configuration and may also configure with at least one of a periodic timer, a prohibit timer to control the frequency of the signaling from the UE (100) and one or more triggers or configuration parameters. In another embodiment, the UE (100) is configured and/or it is specified (e.g., in standards specification) for which triggers or events, the UE (100) can report the signaling. This has been described in earlier in the document.

Single Network/Single Operator Scenarios.

Figure 8:
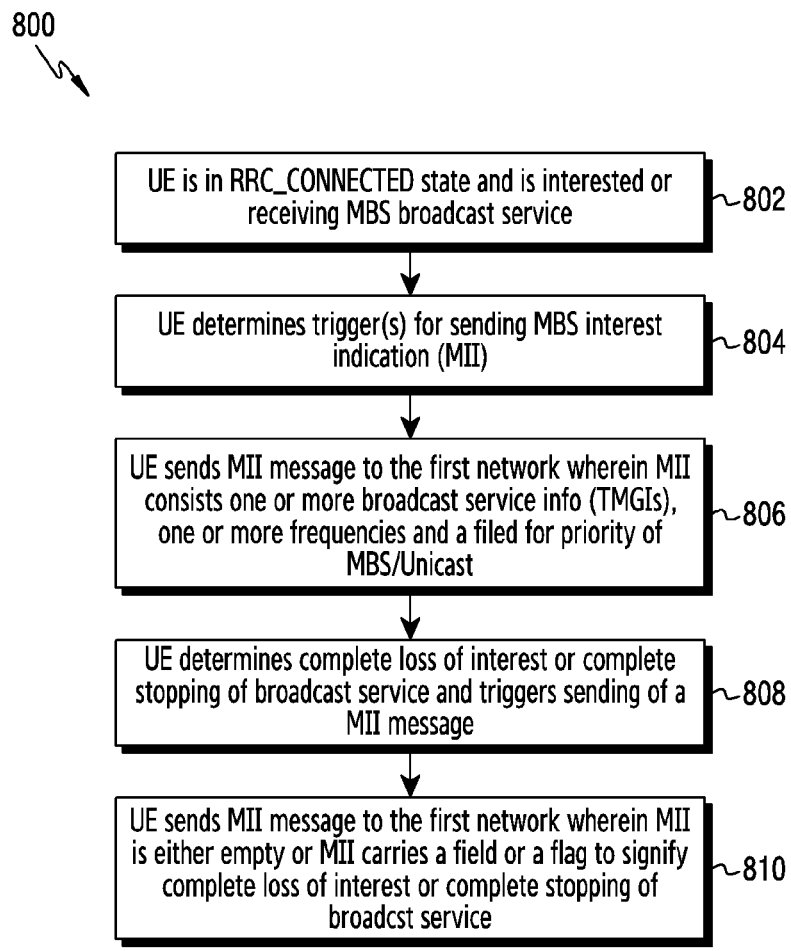
FIG. 8 illustrates a flow chart of an MBS broadcast service reception according to embodiments as disclosed herein.

When the UE (100) is receiving the unicast services as well as the broadcast services on same network (e.g., first network (200A)), there can be a complete loss of interest in the MBS broadcast services and/or stopping of the MBS broadcast services. As in this scenario, there is no relevant frequency or the MBS service to include in the MBS interest indication message (i.e., the message becomes empty), the message is not actually transmitted by the UE (100) to the network. Consequently, the network is not aware with this enhanced UE baseband resource capability and cannot utilize or benefit with gain in the UE's capability. In an embodiment, the UE (100) sends an empty MBS interest indication message to network. In another embodiment, the signaling message carries an explicit indication or a flag or field (e.g., mbs-ZeroInterest or the like) that represents the message is not carrying any parameter and is triggered due to complete loss of interest in MBS broadcast service(s) or complete stopping of the MBS broadcast service(s). This is illustrated in FIG. 8 (which depicts the process of MBS broadcast service reception).

5.9.4.5 Setting of the Contents of MBS Interest Indication.

The UE (100) shall set the contents of the MBS interest indication as follows:

1> if the set of MBS frequencies of interest, determined in accordance with 5.9.4.3, is not empty:

2> include mbs-FreqList and set it to include the MBS frequencies of interest sorted by decreasing order of interest, using the absoluteFrequencySSB for serving frequency, if applicable, and the ARFCN-ValueNR(s) as included in SIB21 or in USD (for neighbouring frequencies);

2> include mbs-Priority if the UE (100) prioritizes reception of all indicated MBS frequencies above reception of any of the unicast bearers and multicast MRBs;

If the UE (100) prioritizes MBS reception and unicast data cannot be supported because of congestion on the MBS carrier(s), NG-RAN may for example initiate release of unicast bearers/multicast MRBs.

2> if SIB20 is provided for the PCell or for the SCell:
    3> include mbs-Services and set it to indicate the set of MBS services of interest sorted by decreasing order of interest determined in accordance with 5.9.4.4.

First Alternative:
    1> if the set of MBS frequencies of interest, determined in accordance with 5.9.4.3, becomes empty after previous transmission of MBS interest indication:
        2> initiate the transmission of empty MBS interest indication.

Second Alternative:
    1> if the set of MBS frequencies of interest, determined in accordance with 5.9.4.3, becomes empty after previous transmission of MBS interest indication:
        2> include mbs-ZeroInterest and/or set this field to TRUE
        2> initiate the transmission of MBS interest indication.

Table 7 corresponds to the embodiment of ALT 1.

TABLE 7

MBS-InterestIndication::= {
    Empty message
}

Table 8 corresponds to the embodiment of ALT 2.

TABLE 8

```
MBS-InterestIndication::= SEQUENCE {
    mbs-FreqList-r17          CarrierFreqListMBS-r17    OPTIONAL,
    mbs-Priority-r17          ENUMERATED {true}         OPTIONAL,
    mbs-ServiceList-r17       MBS-ServiceList-r17       OPTIONAL,
    Mbs-ZeroInterest          ENUMERATED {true}         OPTIONAL
}
CarrierFreqListMBS-r17 ::=    SEQUENCE (SIZE (1..maxFreqMBS-r17)) OF
ARFCN-ValueNR
MBS-ServiceList-r17 ::=            SEQUENCE  (SIZE  (1..maxNrofMBS-
ServiceListPerUE-r17)) OF MBS-ServiceInfo-r17
MBS-ServiceInfo-r17 ::=       SEQUENCE {
    tmgi-r17                  TMGI-r17
}
```

In an embodiment, the UE (100) also indicates the UE (100) baseband resource capability related assistance information, when the UE (100) starts or stops receiving MBS broadcast service from at least one non-serving cell. The signaling message, the UE capability information and/or assistance information can also be one of MBS interest indication message or the UE assistance information message. It can be noted even legacy MII message if carries frequencies or service information for the non-serving cell in the RRC_CONNECTED state, it may not indicate whether the UE (100) is interested, or the UE (100) is actually receiving services and what is the impact on the UE baseband resource (processing) capability. The approach for non-serving cell is further depicted in FIG. 7 (which depicts the process of simultaneous unicast and MBS broadcast service reception on the same network/operator).

In an embodiment, the UE (100) also indicates the UE baseband resource capability related assistance information, when the UE (100) starts or stops receiving MBS broadcast service from at least one secondary serving cell (i.e., Scell). The signaling message, the UE capability information and/or assistance information can also be one of MBS interest indication message or the UE assistance information message. It can be noted even legacy MII message (if it carries frequencies or service information for secondary serving cell) may not indicate whether the UE (100) is interested or the UE (100) is actually receiving services and what is the impact on the UE (100) baseband resource (processing) capability. The approach for Scell is further depicted in FIG. 7 (which depicts the process of simultaneous unicast and MBS broadcast service reception on the same network/operator).

Shared MBS network: in an embodiment, two or more networks or operators may share the network resource (e.g., radio access network (RAN), carrier, serving cell) used for delivery of MBS service (e.g., broadcast service, FTA service or ROM service). There may also be some coordination among the entities of the different networks for service information and service provisioning purpose.

Calculation for UE baseband resource and/or processing capability: In an embodiment, the UE (100) provides one or more parameters for the UE baseband resource and/or processing capability information (e.g., BWP, frequency, SCS information for the one or more services being availed in the second network (200B), DFT/FFT size and/or gain or loss of UE capability) in the signaling message to the first network (200A). The first network (200A) then calculates the available or operating UE baseband resource and/or processing capability (e.g., number of component carriers for CA or dual connectivity that can be supported and/or throughput that can be supported) for the UE (100) for unicast reception and accordingly configures the UE (100) with appropriate configurations.

In an embodiment, the UE (100) calculates the available or operating UE baseband resource and/or processing capability (e.g., number of component carriers for CA or dual connectivity that can be supported and/or throughput that can be supported) for the UE (100) for unicast reception and sends the same in a signaling message (e.g., UE capability information and/or assistance information) to the first network (200A). Accordingly, the first network (200A) configures the UE (100) with appropriate configurations.

In an embodiment, the UE (100) determines and provides the scaling factors (e.g., a ratio or a multiple or a sub-multiple to be utilized) to the first network (200A) to perform the calculation of UE baseband resource and/or processing capability for the UE (100) for unicast reception. Scaling factors considers the UE (100) implementation choices or constraints and accordingly, informs the wireless communication systems (1000) to provide a configuration suitable for the UE implementation. The scaling factors can be static or dynamic and therefore, can be reported once or more as needed. The scaling factors can be reported in at least one of the UE capability information message, the UE assistance information message, the MBS interest indication message and a new RRC or MAC message.

In an embodiment, the UE (100) provides the UE capability information to the network for the support or no support of simultaneous reception of unicast and broadcast (or multicast) on same or different networks/operators. Further, UE (100) can also provide information on the UE capability to support or not support reception on secondary serving cell and/or UE capability to support or not support reception on non-serving cell. This can be indicated in in at least one of UE capability information message, UE assistance information message, MBS interest indication message and a new RRC or MAC message.

Figure 2:
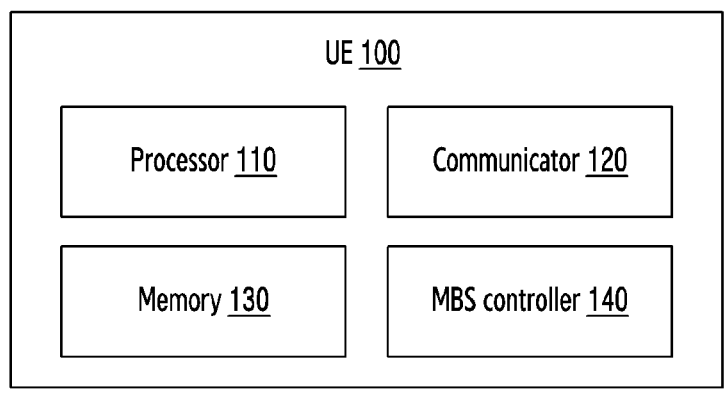
FIG. 2 illustrates various hardware components of a UE according to the embodiments as disclosed herein.

FIG. 2 illustrates various hardware components of the UE (100), according to the embodiments as disclosed herein. In an embodiment, the UE (100) includes a processor (110), a communicator (120), a memory (130) and an MBS controller (140). The processor (110) is coupled with the communicator (120), the memory (130) and the MBS controller (140).

The MBS controller (140) receives the at least one event from the second network (200B). The at least one event can be, for example, but not limited to a start of broadcast service reception, a stop of the broadcast service reception, and a change of the broadcast service reception in one of an idle state, an inactive state and a connected state, a start of multicast service reception in one of an inactive state and a connected state, and a change of the multicast service reception and a stop of the multicast service reception in the inactive state and the connected state.

Based on the at least one received event, the MBS controller (140) sends the message comprising at least one of the UE capability information and the assistance information to the first network (200A). In an embodiment, the MBS controller (140) triggers to send the message comprising at least one of the UE capability information and the assistance information to the first network (200A) based on the at least one received event, and sends the message comprising at least one of the UE capability information and the assistance information to the first network (200). In an embodiment, trigger to send the message comprising at least one of the UE capability information and the assistance information to the first network (200A) based on the at least one received event includes receive at least one first service from the second network (200B) in one of an RRC_IDLE state, an RRC_INACTIVE state and an RRC_CONNECTED state, and at least one second service from the first network (200A) in an RRC_CONNECTED state, and trigger to send the message comprising at least one of the UE capability information and the assistance information to the first network (200A).

In an embodiment, trigger to send the message comprising at least one of the UE capability information and the assistance information to the first network includes triggering at least one of a start of a service from the second network, a stop or termination of the service from the second network, and a change of configuration of the service from the second network.

In an embodiment, at least one of the UE capability information and the assistance information can be, for example, but not limited to the frequency, the absolute radio frequency channel number (ARFCN), the frequency band, the bandwidth, the bandwidth part (BWP) configuration, the sub-carrier spacing (SCS), the temporary mobile group identity (TMGI) session identifier (ID), the MBS session ID, the CFR, the number of PRBs, a number of transmission (Tx) links, the number of reception (Rx) links, the MIMO layers utilized, the number of HARQ processes used for the second network (200B), a number of available HARQ processes available for the first network (200A), the classifier for a different MBS service, an RRC state for the UE on the second network, a radio access Technology (RAT) on the second network, a priority for a service, an operator name, an operator information, a discontinuous reception (DRX) configuration used for services on the second network (200B), the preferred DRX configuration on the first network (200A), the preferred scheduling on the first network (200A), the power consumption at the UE (100), the battery status at the UE (100), the active BWP, the bandwidth of the active BWP, the default BWP, the initial BWP, the bandwidth of the default BWP, the data rate of UE interested or receiving MBS service on one of the first network (200A) and the second network (200B), a number of HARQ Processes used for receiving UE's interested MBS services on the second network (200B), a number of available HARQ Processes used for data reception on the first network (200A), a band combination, Discrete Fourier Transform (DFT) size, the fast Fourier transform (FFT) size, the throughput, the carrier, carrier aggregation, the dual connectivity, services information and the number of services.

In an embodiment, the message can be, for example, but not limited to an RRC signalling message, an MBS interest indication (MII) message, a UE assistance information (UAI) message, a non-access stratum (NAS) signaling message, and a medium access control (MAC) signaling message.

In an embodiment, the message carries at least one of an explicit indication, a flag and a field to include in the message to convey the complete loss of interest in at least one service or complete stopping of at least one service from the second network.

In an embodiment, the message comprising at least one of the UE capability information and the assistance information is triggered on the first network upon meeting at least one condition. The at least one condition comprise linked with triggers, events and reporting of the second network, linked with triggers, events and reporting for the first network, the UE triggers a reporting to the first network, when a UE reception status for Broadcast or ROM or FTA or Multicast service on the second network has been changed or associated parameters have been changed, at events of capability changes on the first network, selected or accumulated reporting for different MBS service types or service groups, when RRC state on at least one of the first network changes and the second network changes, when BWP or CFR on at least one of the second network or the first network is changed or switched or activated or deactivated or made dormant, when MUSIM operation is initiated or terminated, when an MBS session is configured or activated or deactivated or released, and when there is a complete loss of interest or complete stopping of MBS services on the second network.

Further, the MBS controller (140) receives the RRC reconfiguration message comprising at least one of an addition of the UE configuration, a release of the UE configuration and the modification of the UE configuration from the first network based on the message. In an embodiment, the UE receives the RRC reconfiguration message comprising at least one of the addition of the UE configuration, the release of the UE configuration and the modification of the UE configuration from the first network upon determining at least one of the modified UE capability information and the modified assistance information at the first network.

In an embodiment, the at least one of an addition of the UE configuration, release of the UE configuration or modification of the UE configuration includes a bandwidth, bandwidth part (BWP), sub-carrier spacing, frequency, common frequency resource (CFR), number of physical resource blocks (PRBs), number of reception (Rx), number of transmission (Tx), a number of multiple-input multiple-output (MIMO) layers, band or band combination, discrete Fourier transform (DFT) size or fast Fourier transform (FFT) size, throughput, carriers, carrier aggregation, dual connectivity, services information, number of services, the DRX configuration, modulation and coding scheme (MCS) and the MBS radio bearers (MRBs).

The MBS controller (140) receives at least one event from at least one of the Scell and the non-serving cell (240) associated with the network (i.e., first wireless network (200A) or second wireless network (200B)). In an embodiment, the at least one event comprises at least one of a start of broadcast service reception on one of the Scell and the non-serving cell, a stop of broadcast service reception on one of the Scell and the non-serving cell, a start of configuration for at least one broadcast service reception on one of the Scell and the non-serving cell, a stop of configuration for the at least one broadcast service reception on one of the Scell and the non-serving cell, a change of configuration for the at least one broadcast service reception on one of the Scell and the non-serving cell, complete loss of interest of broadcast reception on one of the Scell and the non-serving cell, and complete stop of the broadcast reception on one of the Scell and the Non-serving cell.

Based on the at least one received event, the MBS controller (140) send the message comprising at least one information to the primary cell (Pcell) (200C) associated with the network. In an embodiment, the at least one information comprises at least one of an interested service information, a change in the interested service information and a zero interest in the interested service information. Further, the MBS controller (140) receives an RRC reconfiguration message comprising at least one configuration from the primary cell associated with the network based on the message.

In an embodiment, the MBS controller (140) receive the signal including an indication in a SIB message the support of a UE capability and assistance information reporting. Further, the MBS controller (140) utilizes the UE capability and assistance information reporting.

In an embodiment, the MBS controller (140) acquires the parameter for at least one of the UE baseband resource, the UE capability information and the assistance information. Based on the at least one acquired parameter, the MBS controller (140) estimates at least one of the available UE baseband resource, the available processing capability information, the operating UE baseband resource, and the operating processing capability information. Further, the MBS controller (140) sends the message including at least one of the available UE baseband resource, the available processing capability information, the operating UE baseband resource, and the operating processing capability information to a network (e.g., first network (200A) or the second network (200B)). Based on the message, the MBS controller (140) receives the suitable configuration from the network. The MBS controller (140) configures the suitable configuration at the UE (100).

The MBS controller (140) is implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in random access memory (RAM) or cache).

Although the FIG. 2 shows various hardware components of the UE (100) but it is to be understood that other embodiments are not limited thereon. In other embodiments, the UE (100) may include less or more number of components. Further, the labels or names of the components are used only for illustrative purpose and does not limit the scope of the present disclosure. One or more components can be combined together to perform same or substantially similar function in the UE (100).

Figure 3:
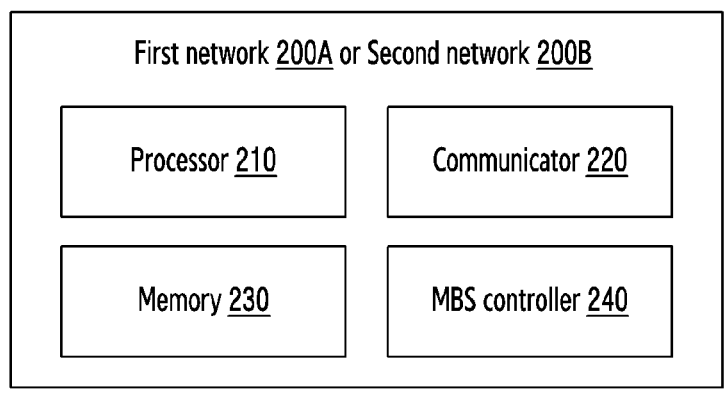
FIG. 3 illustrates various hardware components of a first wireless network or a second wireless network, according to the embodiments as disclosed herein.

FIG. 3 illustrates various hardware components of the first network (200A) or the second network (200B) according to the embodiments as disclosed herein. In an embodiment, the first network (200A) or the second network (200B) includes a processor (210), a communicator (220), a memory (230) and an MBS controller (240). The processor (210) is coupled with the communicator (220), the memory (230) and the MBS controller (240).

The MBS controller (240) receives the signaling message comprising the at least one parameter for the UE baseband resource, the assistance information and the UE capability information from the UE (100). Based on the received signaling message, the MBS controller (240) estimates at least one of the available UE baseband resource, the available processing capability information, the operating UE baseband resource, and the operating processing capability information. Further, the MBS controller (240) configures the UE (100) with the suitable configuration based on the estimation.

The MBS controller (240) is implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (210) is configured to execute instructions stored in the memory (230) and to perform various processes. The communicator (220) is configured for communicating internally between internal hardware components and with external devices via one or more networks. The memory (230) also stores instructions to be executed by the processor (210). The memory (230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in random access memory (RAM) or cache).

Although the FIG. 3 shows various hardware components of the first network (200A) or the second network (200B) but it is to be understood that other embodiments are not limited thereon. In other embodiments, the first network (200A) or the second network (200B) may include less or more number of components. Further, the labels or names of the components are used only for illustrative purpose and does not limit the scope of the present disclosure. One or more components can be combined together to perform same or substantially similar function in the first network (200A) or the second network (200B).

FIG. 4 illustrates the process of simultaneous unicast and MBS broadcast service reception according to embodiments as disclosed herein.

At 0, the first network (200A) broadcasts, in the SIB message, the indication for the support of reporting for shared processing information. At 1, the RRC connection is established between the UE (100) and the first network (200A). At 2, the first network (200A) sends the RRC reconfiguration message (including the configuration) to the UE (100). At 3, the unicast reception is started between the UE (100) and the first network (200A). At 4, the UE (100) receives the broadcast service in the idle state or the inactive state or the connected state and there is at least one of start of broadcast service or stop of broadcast service or change of broadcast configuration to the UE (100). At 5, the UE (100) triggers of sending of the UE capability information and/or assistance information. At 6, the UE (100) sends the UE capability information and/or assistance information to the first network (200A). At 7, the first network (200A) determines the modified configuration based on the UE capability information and/or the assistance information. At 8, the first network (200A) sends the RRC reconfiguration message (including the modified configurations) to the UE (100).

FIG. 5 illustrates the process of simultaneous unicast and MBS multicast service reception, according to embodiments as disclosed herein.

At 0, the first network (200A) broadcasts, in the SIB message, the indication for the support of reporting for shared processing information. At 1, the RRC connection is established between the UE (100) and the first network (200A). At 2, the first network (200A) sends the RRC reconfiguration message (including the configuration) to the UE (100). At 3, the unicast reception is started between the UE (100) and the first network (200A). At 4, there is at least one of the start, stop or change of the multicast service reception in the inactive state for the UE (100). At 5, the UE (100) triggers of sending of UE capability information and/or assistance information. At 6, the UE (100) sends the UE capability information and/or assistance information to the first network (200A). At 7, the first network (200A) determines the modified configuration based on the UE capability information and/or the assistance information. At 8, the first network (200A) sends the RRC reconfiguration message (including the modified configurations) to the UE (100).

FIG. 6 illustrates the process of simultaneous unicast and MBS multicast service reception according to embodiments as disclosed herein.

At 0, the first network (200A) broadcasts, in the SIB message, the indication for the support of reporting for shared processing information. At 1, the RRC connection is established between the UE (100) and the first network (200A). At 2, the first network (200A) sends the RRC reconfiguration message (including the configuration) to the UE (100). At 3, the unicast reception is started between the UE (100) and the first network (200A). At 4, the RRC connection is established between the UE (100) and the second network (200B). At 5, the second network (200B) sends the RRC reconfiguration message (including the multicast service configuration) to the UE (100). At 6, there is at least one of the start, stop or change of the multicast service reception in the connected state to the UE (100). At 7, the UE (100) triggers of sending of UE capability information and/or assistance information. At 8, the UE (100) sends the UE capability information and/or assistance information to the first network (200A). At 9, the first network (200A) determines the modified configuration based on the UE capability information and/or the assistance information. At 10, the first network (200A) sends the RRC reconfiguration message (including the modified configurations) to the UE (100).

Figure 7:
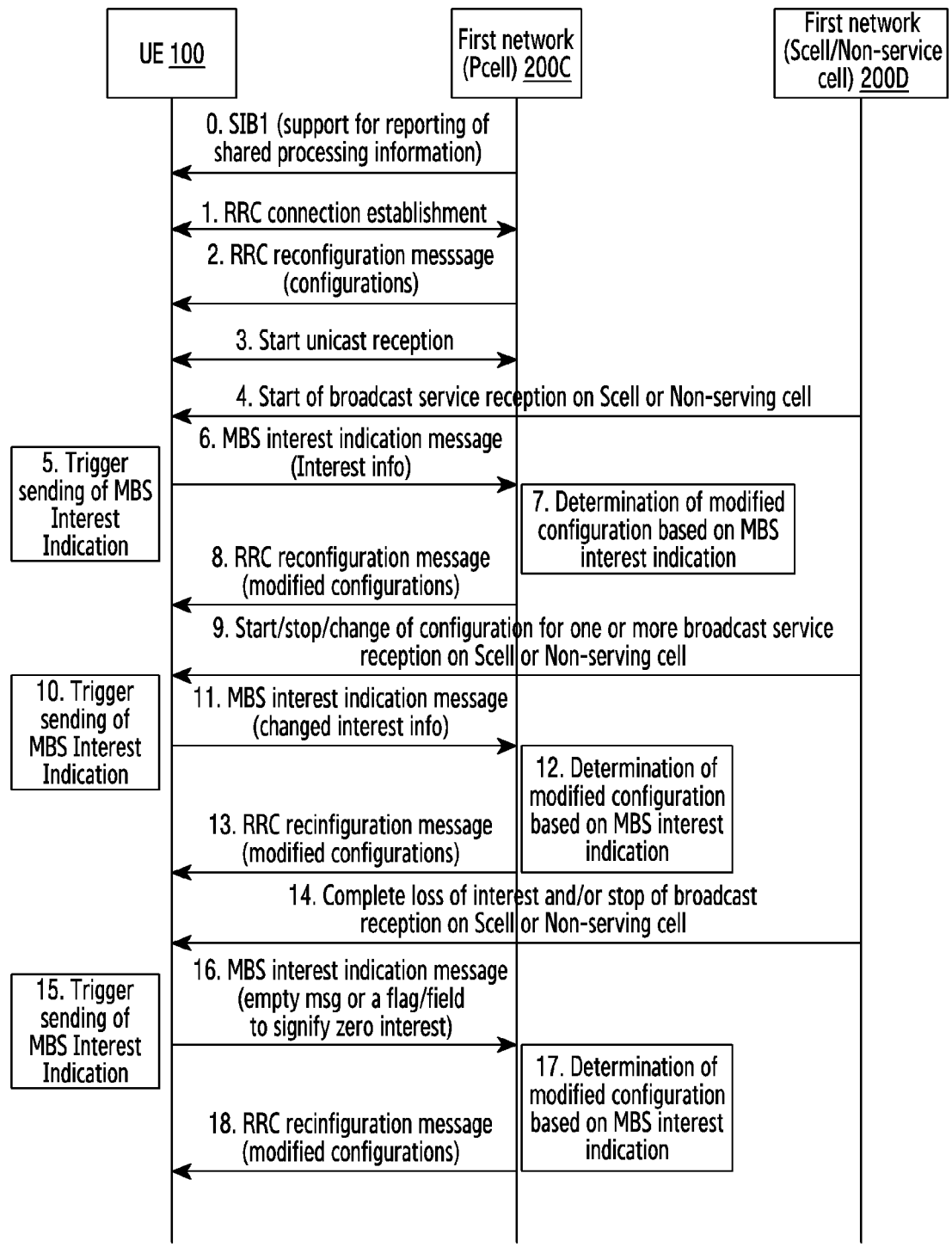
FIG. 7 illustrates a process of simultaneous unicast and MBS broadcast service reception on the same network/operator according to embodiments as disclosed herein.

FIG. 7 illustrates the process of simultaneous unicast and MBS broadcast service reception on the same network/operator according to embodiments as disclosed herein.

At 0, the first network (200A) broadcasts, in the SIB message, the indication for the support of reporting for shared processing information. At 1, the RRC connection is established between the UE (100) and the Pcell (200C) in the first network (200A). At 2, the Pcell (200C) sends the RRC reconfiguration message (including the configuration) to the UE (100). At 3, the unicast reception is started between the UE (100) and the Pcell (200C). At 4, on the Scell/Non-serving cell (200D) of the second network (200B) UE (100) starts the broadcast service reception. At 5, the UE (100) triggers of sending of MBS interest indication. At 6, the UE (100) sends the MBS interest indication including the interest information to the Pcell (200C). At 7, the Pcell (200C) determines the modified configuration based on the MBS interest indication. At 8, the Pcell (200C) sends the RRC reconfiguration message (including the modified configurations) to the UE (100).

At 9, on the Scell/Non-serving cell (200D) of the second network (200B), there is start/stop/change of configuration for one or more broadcast service reception for the UE (100). At 10, the UE (100) triggers of sending of MBS interest indication. At 11, the UE (100) sends the MBS interest indication including the interest information to the Pcell (200C). At 12, the Pcell (200C) determines the modified configuration based on the MBS interest indication. At 13, the Pcell (200C) sends the RRC reconfiguration message (including the modified configurations) to the UE (100).

At 14, on the Scell/Non-serving cell (200D) of the second network (200B), there is a complete loss of interest and/or stop of broadcast reception on the Scell or Non-serving cell for the UE (100). At 15, the UE (100) triggers of sending of MBS interest indication. At 16, the UE (100) sends the MBS interest indication including the empty msg or a flag/field to signify zero interest to the Pcell (200C). At 17, the Pcell (200C) determines the modified configuration based on the MBS interest indication. At 18, the Pcell (200C) sends the RRC reconfiguration message (including the modified configurations) to the UE (100).

FIG. 8 illustrate a flow chart (S800) of the MBS broadcast service reception according to embodiments as disclosed herein.

At S802, the UE (100) is in the RRC_CONNECTED state and is interested or receiving MBS broadcast service. At S804, the UE (100) determines trigger(s) for sending MBS interest indication (MII). At S806, the UE (100) sends the MII message to the first network (200A) wherein the MII consists one or more broadcast service info (TMGIs), one or more frequencies and the field for priority of MBS/unicast. At S808, the UE (100) determines complete loss of interest or complete stopping of broadcast service and triggers sending of the MII message. At S810, the UE (100) sends the MII message to the first network (200A) where the MII is either empty or MII carries a field or a flag to signify complete loss of interest or complete stopping of the broadcast service.

FIG. 9 to FIG. 12 illustrate flow charts (S900-S1200) of methods, performed by the UE (100), for handling the UE capability information and assistance information during the MBS in the wireless communication system according to the embodiments as disclosed herein.

Figure 9:
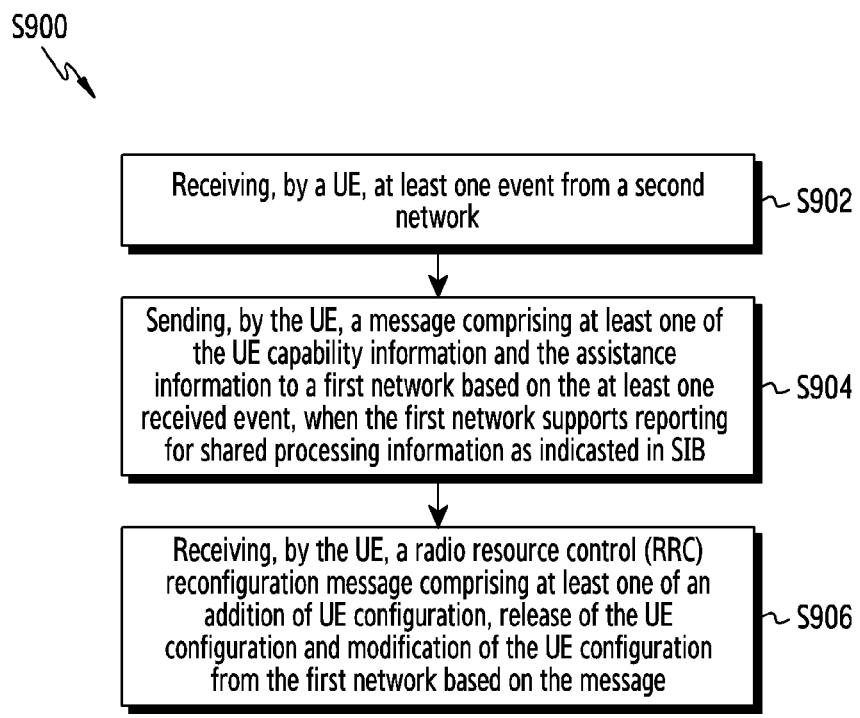
FIG. 9 to FIG. 12 illustrate flow charts of a method, performed by a UE, for handling the UE capability information and assistance information during the MBS in the wireless communication system according to the embodiments as disclosed herein.

As shown in the FIG. 9, the operations (S902-S906) are handled by the MBS controller (140). At S902, the method includes receiving the at least one event from the second network (200B). At S904, the method includes sending the message (e.g., MBS interest indication message) comprising at least one of the UE capability information and the assistance information to the first network (200A) based on the at least one received event, when the first network (200A) supports reporting for shared processing information as indicated in the SIB. At S906, the method includes receiving the RRC reconfiguration message comprising at least one of an addition of UE configuration, release of the UE configuration and modification of the UE configuration from the first network (200A) based on the message.

Figure 10:
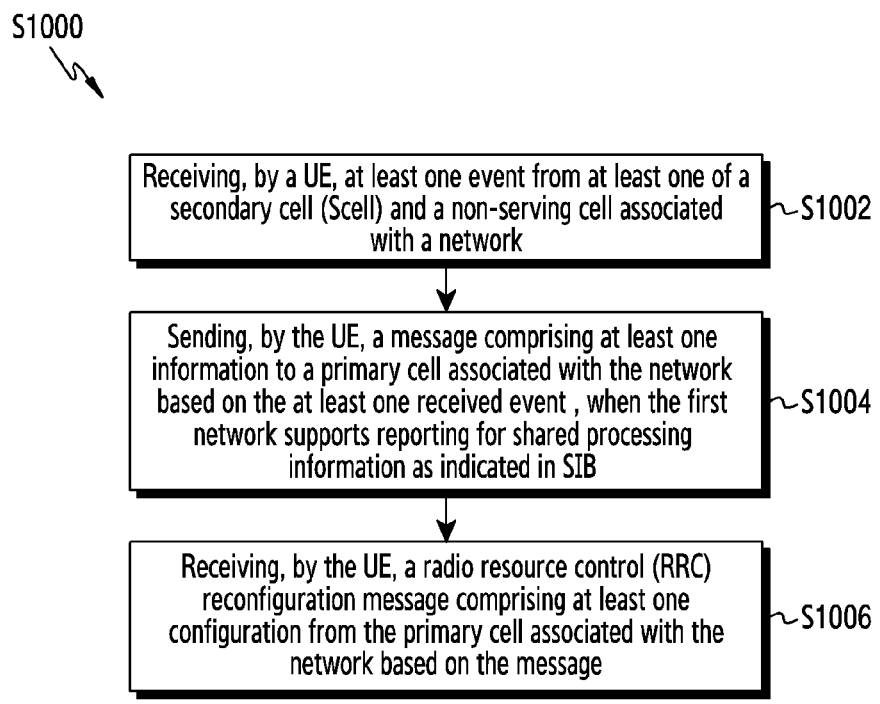

As shown in the FIG. 10, the operations (S1002-S1006) are handled by the MBS controller (140). At S1002, the method includes receiving the at least one event from at least one of the Scell and the non-serving cell (200D) associated with the network (200A). At S1004, the method includes sending the message (e.g., MBS interest indication message) comprising at least one information to the primary cell (200C) associated with the network (200A) based on the at least one received event, when the first network (200A) supports reporting for shared processing information as indicated in SIB. At S1006, the method includes receiving the RRC reconfiguration message comprising at least one configuration from the primary cell (200C) associated with the network based on the message.

Figure 11:
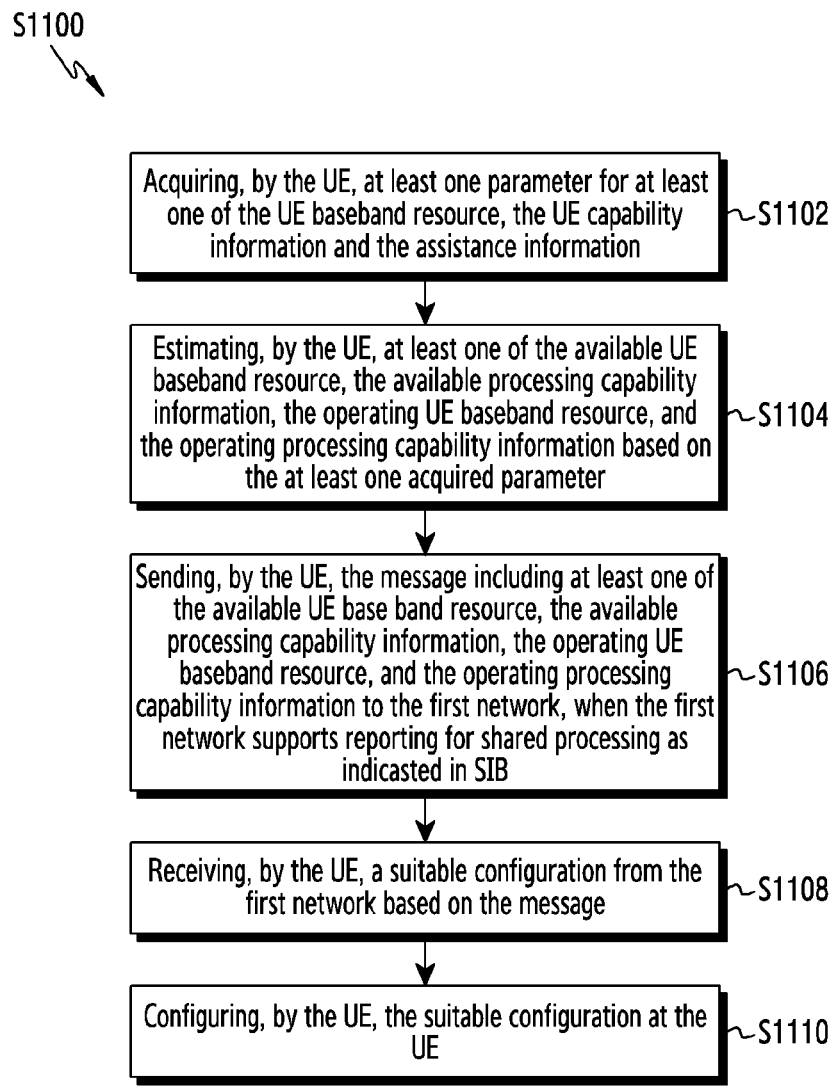

As shown in the FIG. 11, the operations (S1102-1110) are handled by the MBS controller (140). At S1102, the method includes acquiring the at least one parameter for at least one of the UE baseband resource, the UE capability information and the assistance information. At S1104, the method includes estimating at least one of the available UE baseband resource, the available processing capability information, the operating UE baseband resource, and the operating processing capability information based on the at least one acquired parameter. At S1106, the method includes sending the message (e.g., MBS interest indication message) including at least one of the available UE baseband resource, the available processing capability information, the operating UE baseband resource, and the operating processing capability information to the first network (200A), when the first network (200A) supports reporting for shared processing information as indicated in SIB. At S1108, the method includes receiving the suitable configuration from the first network based on the message. At S1110, the method includes configuring the suitable configuration at the UE (100).

Figure 12:
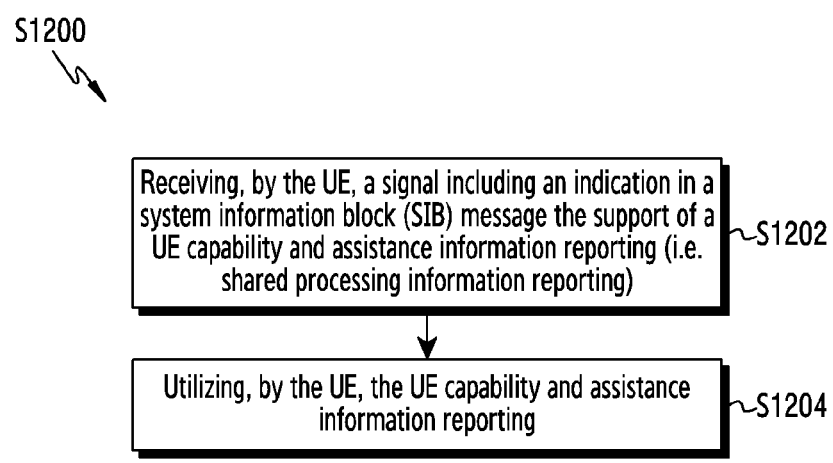

As shown in the FIG. 12, the operations (S1202-1204) are handled by the MBS controller (140). At S1202, the method includes receiving the signal including the indication in the SIB message for the support of the UE capability and assistance information reporting (i.e., shared processing information reporting) from the first network. At S1204, the method includes utilizing the UE capability and assistance information reporting (e.g., in an MBS interest indication message).

Figure 13:
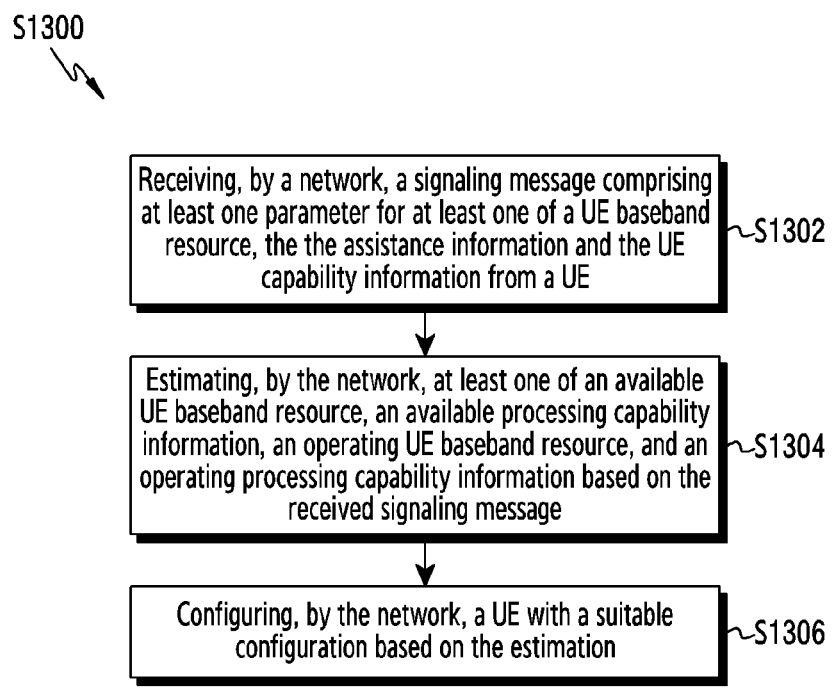
FIG. 13 illustrates a flow chart of a method, performed by a first network, for handling the UE capability information and assistance information during the MBS in the wireless communication system according to the embodiments as disclosed herein.

FIG. 13 illustrates a flow chart (S1300) of a method, performed by the first network (200A) or the second network (200B), for handling the UE capability information and assistance information during the MBS in the wireless communication system (1000), according to the embodiments as disclosed herein. The operations (S1302-S1306) are handled by the MBS controller (240).

At S1302, the method includes receiving the signaling message (e.g., MBS interest indication message) comprising the at least one parameter for at least one of the UE baseband resource, the assistance information and the UE capability information from the UE (100). At S1304, the method includes estimating at least one of the available UE baseband resource, the available processing capability information, the operating UE baseband resource, and the operating processing capability information based on the received signaling message. At S1306, the method includes configuring the UE (100) with the suitable configuration based on the estimation (e.g., through an RRC reconfiguration message).

Based on the provided methods, the UE (100) may be able to support the configuration and/or will support device or service performance in an optimum manner. This, results in enhancing the user experience.

The various actions, acts, blocks, steps, or the like in the flow charts (S800-S1300) may be performed in the order presented, in a different order or simultaneously. Further, in some embodiments, some of the actions, acts, blocks, steps, or the like may be omitted, added, modified, skipped, or the like without departing from the scope of the present disclosure.

Figure 14:
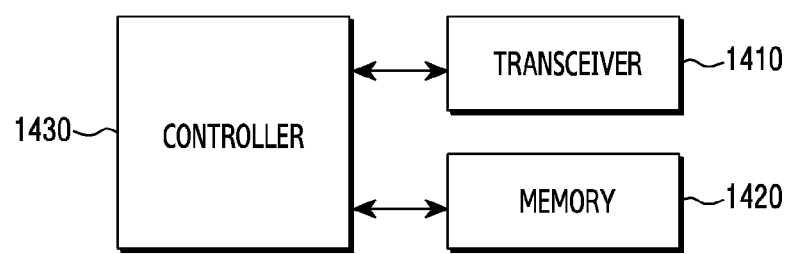
FIG. 14 illustrates a block diagram of a terminal (or a user equipment (UE)) according to an embodiment of the disclosure.

FIG. 14 illustrates a block diagram of a terminal (or a user equipment (UE)) according to an embodiment of the disclosure.

As shown in FIG. 14, a terminal according to an embodiment may include a transceiver 1410, a memory 1420, and a processor (or a controller) 1430. The transceiver 1410, the memory 1420, and the processor (or controller) 1430 of the terminal may operate according to a communication method of the terminal described above. However, the components of the terminal are not limited thereto. For example, the terminal may include more or fewer components than those described in FIG. 14. In addition, the processor (or controller) 1430, the transceiver 1410, and the memory 1420 may be implemented as a single chip. Also, the processor (or controller) 1430 may include at least one processor.

The transceiver 1410 collectively refers to a terminal station receiver and a terminal transmitter, and may transmit/receive a signal to/from a base station or another terminal. The signal transmitted or received to or from the terminal may include control information and data. The transceiver 1410 may include a RF transmitter for up-converting and amplifying a frequency of a transmitted signal, and a RF receiver for amplifying low-noise and down-converting a frequency of a received signal. However, this is only an example of the transceiver 1410 and components of the transceiver 1410 are not limited to the RF transmitter and the RF receiver.

Also, the transceiver 1410 may receive and output, to the processor (or controller) 1430, a signal through a wireless channel, and transmit a signal output from the processor (or controller) 1430 through the wireless channel.

The memory 1420 may store a program and data required for operations of the terminal. Also, the memory 1420 may store control information or data included in a signal obtained by the terminal. The memory 1420 may be a storage medium, such as read-only memory (ROM), random access memory (RAM), a hard disk, a CD-ROM, and a DVD, or a combination of storage media.

The processor (or controller) 1430 may control a series of processes such that the terminal operates as described above. For example, the processor (or controller) 1430 may receive a data signal and/or a control signal, and the processor (or controller) 1430 may determine a result of receiving the signal transmitted by the base station and/or the other terminal.

Figure 15:
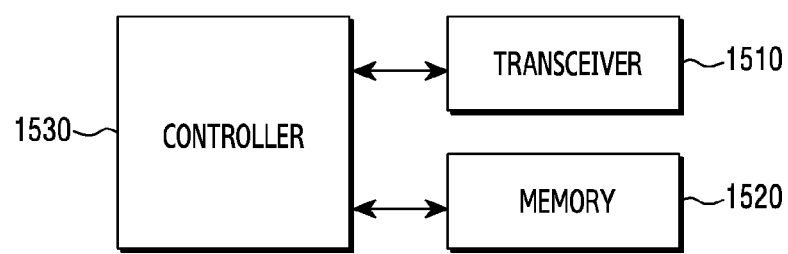
FIG. 15 illustrates a block diagram of a base station according to an embodiment of the disclosure.

FIG. 15 illustrates a block diagram of a base station, according to embodiments of the present disclosure.

As shown in FIG. 15 is, the base station of the present disclosure may include a transceiver 1510, a memory 1520, and a processor (or, a controller) 1530. The transceiver 1510, the memory 1520, and the processor (or controller) 1530 of the base station may operate according to a communication method of the base station described above. However, the components of the base station are not limited thereto. For example, the base station may include more or fewer components than those described in FIG. 15. In addition, the processor (or controller) 1530, the transceiver 1510, and the memory 1520 may be implemented as a single chip. Also, the processor (or controller) 1530 may include at least one processor.

The transceiver 1510 collectively refers to a base station receiver and a base station transmitter, and may transmit/receive a signal to/from a terminal, another base station, and/or a core network function(s) (or entity(s)). The signal transmitted or received to or from the base station may include control information and data. The transceiver 1510 may include a RF transmitter for up-converting and amplifying a frequency of a transmitted signal, and a RF receiver for amplifying low-noise and down-converting a frequency of a received signal. However, this is only an example of the transceiver 1510 and components of the transceiver 1510 are not limited to the RF transmitter and the RF receiver.

Also, the transceiver 1510 may receive and output, to the processor (or controller) 1530, a signal through a wireless channel, and transmit a signal output from the processor (or controller) 1530 through the wireless channel.

The memory 1520 may store a program and data required for operations of the base station. Also, the memory 1520 may store control information or data included in a signal obtained by the base station. The memory 1520 may be a storage medium, such as ROM, RAM, a hard disk, a CD-ROM, and a DVD, or a combination of storage media.

The processor (or controller) 1530 may control a series of processes such that the base station operates as described above. For example, the processor (or controller) 1530 may receive a data signal and/or a control signal, and the processor (or controller) 1530 may determine a result of receiving the signal transmitted by the terminal and/or the core network function.

The methods according to the embodiments described in the claims or the detailed description of the present disclosure may be implemented in hardware, software, or a combination of hardware and software.

When the electrical structures and methods are implemented in software, a computer-readable recording medium having one or more programs (software modules) recorded thereon may be provided. The one or more programs recorded on the computer-readable recording medium are configured to be executable by one or more processors in an electronic device. The one or more programs include instructions to execute the methods according to the embodiments described in the claims or the detailed description of the present disclosure.

The embodiments disclosed herein can be implemented through at least one software program running on at least one hardware device and performing network management functions to control the elements. The elements can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein can be practiced with modification within the spirit and scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
    receiving, from a base station, a system information block 1 (SIB1) including information for a shared processing of a a multicast and broadcast service (MBS) broadcast and a unicast, wherein the information for the shared processing allows a transmission of an MBS interest indication message for an MBS broadcast reception on a non-serving cell; and
    transmitting, to the base station, the MBS interest indication message including information on a broadcast frequency, information on a subcarrier spacing, and information on a common frequency resource (CFR),
    wherein the MBS interest indication message is transmitted upon starting or stopping a reception of an MBS broadcast service on the non-serving cell, or upon a change of the information of the subcarrier spacing or the information on the CFR the shared processing information.

2. The method of claim 1, further comprising:
    transmitting, to the base station, information on a capability for receiving the MBS broadcast service from the non-serving cell, wherein a scheduling of the terminal is based on at least one of the MBS interest indication message or the information on the capability.

3. The method of claim 1, wherein the MBS interest indication message is transmitted irrespective of a reception of an SIB21.

4. The method of claim 1, wherein the terminal is in a radio resource control (RRC) connected state.

5. A method performed by a base station in a wireless communication system, the method comprising:
    transmitting, to a terminal, a system information block 1 (SIB1) including information for a shared processing of a a multicast and broadcast service (MBS) broadcast and a unicast, wherein the information for the shared processing allows a reception of an MBS interest indication message for an MBS broadcast reception on a non-serving cell; and
    receiving, from the terminal, the MBS interest indication message including information on a broadcast frequency, information on a subcarrier spacing, and information on a common frequency resource, CFR,
    wherein the MBS interest indication message is received upon starting or stopping a transmission of an MBS broadcast service on the non-serving cell, or upon a change of the information of the subcarrier spacing or the information on the CFR.

6. The method of claim 5, further comprising:
    receiving, from the terminal, information on a capability for transmitting the MBS broadcast service from the non-serving cell,
    wherein a scheduling of the terminal is based on at least one of the MBS interest indication message or the information on the capability.

7. The method of claim 5, wherein the MBS interest indication message is received irrespective of transmission of an SIB21.

8. The method of claim 5, wherein the terminal is in a radio resource control (RRC) connected state.

9. A terminal comprising:
    at least one transceiver; and
    at least one processor communicatively coupled to the at least one transceiver; and
    at least one memory, communicatively coupled to the at least one processor, storing instructions executable by the at least one processor individually or in any combination to cause the terminal to:
    receive, from a base station, a system information block 1 (SIB1) including information for a shared processing of a multicast and broadcast service (MBS) broadcast and a unicast, wherein the information for the shared processing allows a transmission of an MBS interest indication message for an MBS broadcast reception on a non-serving cell, and
    transmit, to the base station, the MBS interest indication message including information on a broadcast frequency, information on a subcarrier spacing, and information on a common frequency resource (CFR),
    wherein the MBS interest indication message is transmitted upon starting or stopping a reception of an MBS broadcast service on the non-serving cell, or upon a change of the information of the subcarrier spacing or the information on the CFR.

10. The terminal of claim 9, wherein the instructions further cause the terminal to:
    transmit, to the base station, information on a capability for receiving the MBS broadcast service from the non-serving cell,
    wherein a scheduling of the terminal is based on at least one of the MBS interest indication message the information on the capability.

11. The terminal of claim 9, wherein the MBS interest indication message is transmitted irrespective of a reception of an SIB21.

12. The terminal of claim 9, wherein the terminal is in a radio resource control (RRC) connected state.

13. A base station comprising:
    at least one transceiver; and
    at least one processor communicatively coupled to the at least one transceiver; and
    at least one memory, communicatively coupled to the at least one processor, storing instructions executable by the at least one processor individually or in any combination to cause the base station to:
    transmit, to a terminal, a system information block 1 (SIB1) including information for a shared processing of a a multicast and broadcast service (MBS) broadcast and a unicast, wherein the information for the shared processing allows a reception of an MBS interest indication message for an MBS broadcast reception on a non-serving cell, and
    receive, from the terminal, the MBS interest indication message including information on a broadcast frequency, information on a subcarrier spacing, and information on a common frequency resource, CFR,
    wherein the MBS interest indication message is received upon starting or stopping a transmission of an MBS broadcast service on the non-serving cell, or upon a change of the information of the subcarrier spacing or the information on the CFR.

14. The base station of claim 13, wherein the instructions further cause the base station to:
    receive, from the terminal, information on a capability for transmitting the MBS broadcast service from the non-serving cell,
    wherein a scheduling of the terminal is based on at least one of the MBS interest indication message or the information on the capability.

15. The base station of claim 13, wherein the MBS interest indication message is received irrespective of a transmission of an SIB21.

16. The base station of claim 13, wherein the terminal is in a radio resource control (RRC) connected state.

* * * * *